(12) United States Patent
Sapuram et al.

(10) Patent No.: US 9,716,634 B2
(45) Date of Patent: Jul. 25, 2017

(54) FULFILLMENT OF CLOUD SERVICE ORDERS

(71) Applicant: Gravitant, Inc, Austin, TX (US)

(72) Inventors: Raghunath Sapuram, Austin, TX (US); Manish Modh, Cedar Park, TX (US); Kedar Dave, Austin, TX (US); Kishor Grandhe, Round Rock, TX (US); Raghuram Krishnan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/925,876

(22) Filed: Oct. 28, 2015

(65) Prior Publication Data

US 2016/0065417 A1 Mar. 3, 2016

Related U.S. Application Data

(63) Continuation-in-part of application No. 14/096,004, filed on Dec. 3, 2013.

(Continued)

(51) Int. Cl.
*G06F 15/173* (2006.01)
*H04L 12/24* (2006.01)
(Continued)

(52) U.S. Cl.
CPC .............. *H04L 41/50* (2013.01); *G06F 8/60* (2013.01); *G06F 9/45533* (2013.01); *G06F 9/45558* (2013.01); *G06F 9/50* (2013.01); *G06Q 30/0629* (2013.01); *G06Q 30/0631* (2013.01); *G06Q 40/00* (2013.01); *H04L 41/5054* (2013.01); *H04L 43/062* (2013.01); *H04L 47/70* (2013.01); *H04L 47/78* (2013.01); *H04L 67/10* (2013.01); *H04L 67/1097* (2013.01);
(Continued)

(58) Field of Classification Search
None
See application file for complete search history.

(56) References Cited

U.S. PATENT DOCUMENTS

2010/0042720 A1* 2/2010 Stienhans ............. G06F 9/5072
709/226
2010/0332262 A1* 12/2010 Horvitz ................. G06F 9/5027
705/4

(Continued)

*Primary Examiner* — Richard G Keehn
*Assistant Examiner* — Hassan Khan
(74) *Attorney, Agent, or Firm* — David O. Simmons; IVC Patent Agency

(57) ABSTRACT

A fulfillment bridge orchestrates various types of fulfillment that fall generally into three categories of fulfillment: CSB platform based automated provisioning; external automated provisioning; and manual workflow provisioning. External automated provisioning is implemented through fulfillment agents. The fulfillment agents can implements self-registration for allowing the fulfillment bridge to understand the capabilities of the fulfillment agent. Examples of such capabilities include, but are not limited to, supported actions and input/output parameters. Adapters of the fulfillment bridge interface with the fulfillment agents and fulfillment scripts that are independently operated with respect to the CSB platform can be use to interface with the fulfillment adapters.

9 Claims, 12 Drawing Sheets

Related U.S. Application Data

(60) Provisional application No. 61/789,865, filed on Mar. 15, 2013, provisional application No. 61/790,536, filed on Mar. 15, 2013, provisional application No. 61/792,998, filed on Mar. 15, 2013, provisional application No. 61/798,567, filed on Mar. 15, 2013.

(51) Int. Cl.
| | | |
|---|---|---|
| *H04L 29/08* | (2006.01) | |
| *H04L 12/26* | (2006.01) | |
| *G06Q 30/06* | (2012.01) | |
| *G06F 9/445* | (2006.01) | |
| *G06F 9/455* | (2006.01) | |
| *G06Q 40/00* | (2012.01) | |
| *H04L 12/911* | (2013.01) | |
| *G06F 9/50* | (2006.01) | |

(52) U.S. Cl.
CPC .............. *H04L 67/16* (2013.01); *H04L 67/20* (2013.01); *H04L 67/2809* (2013.01); *G06F 2009/45562* (2013.01); *H04L 41/145* (2013.01)

(56) References Cited

U.S. PATENT DOCUMENTS

| | | | | |
|---|---|---|---|---|
| 2011/0145094 | A1* | 6/2011 | Dawson | G06F 9/5027 705/26.63 |
| 2011/0252420 | A1* | 10/2011 | Tung | G06F 9/5072 718/1 |
| 2011/0295999 | A1* | 12/2011 | Ferris | G06F 9/5072 709/224 |
| 2012/0072581 | A1* | 3/2012 | Tung | G06F 9/5072 709/224 |
| 2012/0072910 | A1* | 3/2012 | Martin | G06F 9/45533 718/1 |
| 2012/0179824 | A1* | 7/2012 | Jackson | G06F 9/5027 709/226 |
| 2013/0060945 | A1* | 3/2013 | Allam | G06F 9/5072 709/226 |
| 2013/0066940 | A1* | 3/2013 | Shao | H04L 67/1025 709/201 |
| 2013/0067090 | A1* | 3/2013 | Batrouni | H04L 67/1097 709/226 |
| 2013/0185413 | A1* | 7/2013 | Beaty | G06F 9/5072 709/224 |
| 2013/0346543 | A1* | 12/2013 | Benantar | G06F 9/5055 709/217 |
| 2014/0229607 | A1* | 8/2014 | Jung | H04L 43/0876 709/224 |

* cited by examiner

-Prior Art- cloudMatrix Resource Solution Center   ⑦Help                                                           Close ⊗

Service Catalog   ⑦Help

⊙ Infrastructure Resources
  NAS Storage
  Shared Storage
  Backup Server/Storage
  ▓Monitoring Solution▓
  Physical Server
⊙ Network Services
  VPN–Hardware
  VPN–Software
  Public IP Addresses
⊙ Integration Services
⊙ Managed Services
  Backup Administration
  Hosting
  System Administration

Resource Context                                                                                      ⑦Help Application [BrazosFinancialsCluster ▼]   VDC *[BrazosTerremarkWest ▼]   VDC Provider Terremark
Environment* [Production ▼]   Layer *[Application Server ▼]

Select from following Services available in category: Monitoring Solution
A virtual machine with system monitoring server software pre-installed and configured to
send data to this portal for utilization and monitoring views.

| | Provider | Service | Description |
|---|---|---|---|
| ⦿ | Gravitant | Xymon VDC Monitoring | A software–based solution for system monitoring of virtual machine resources for a virtual data center |
| ○ | Gravitant | Xymon VDC Monitoring Client | The client software that needs to be installed on each virtual machine to enable the System Monitoring Solution |

Additional Information:
This solution is required to enable system utilization monitoring for capacity planning, cost
controls, and autoscaling policies in this portal. This solution can be deployed in an new virtual

[Next]

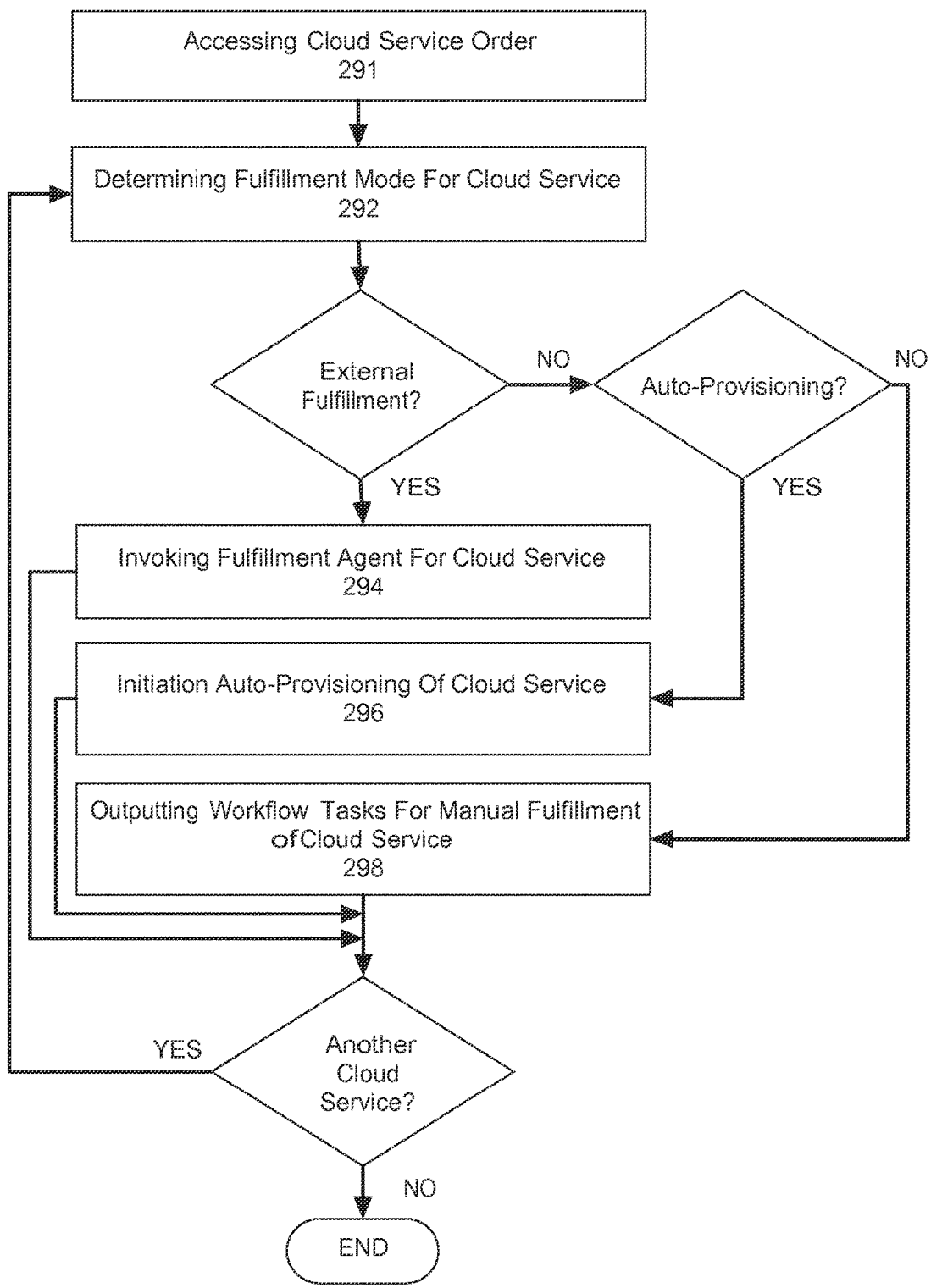

US 9,716,634 B2

FULFILLMENT OF CLOUD SERVICE ORDERS

CROSS REFERENCE TO RELATED APPLICATIONS

This non-provisional patent application is a continuation-in-part that claims priority from the U.S. non-provisional patent application having Ser. No. 12/096,004 filed Dec. 3, 2013 entitled "INTEGRATED CLOUD SERVICE BROKERAGE (CSB) PLATFORM FUNCTIONALITY MODULES", having a common applicant herewith, and being incorporated herein in its entirety by reference.

U.S. non-provisional patent application having Ser. No. 12/096,004 claims priority from the U.S. provisional patent application having Ser. No. 61/789,865 filed Mar. 15, 2013 entitled "SYSTEMS, METHODS AND COMPUTER READABLE MEDIUMS FOR IMPLEMENTING CLOUD SERVICE BROKERAGE PLATFORM FUNCTIONALITIES", having a common applicant herewith, and being incorporated herein in its entirety by reference.

U.S. non-provisional patent application having Ser. No. 12/096,004 claims priority from the U.S. provisional patent application having Ser. No. 61/790,536 filed Mar. 15, 2013 entitled "CLOUD SERVICE BROKERAGE (CSB) PLATFORM ARCHITECTURE/PORTAL USE CASE IMPLEMENTATIONS", having a common applicant herewith, and being incorporated herein in its entirety by reference.

U.S. non-provisional patent application having Ser. No. 12/096,004 claims priority from the U.S. provisional patent application having Ser. No. 61/792,998 filed Mar. 15, 2013 entitled "CLOUD SERVICE BROKERAGE (CSB) PLATFORM PORTAL AND CSB PLATFORM ARCHITECTURE FOR PROVIDING SAME", having a common applicant herewith, and being incorporated herein in its entirety by reference.

U.S. non-provisional patent application having Ser. No. 12/096,004 claims priority from the U.S. provisional patent application having Ser. No. 61/798,567 filed Mar. 15, 2013 entitled "SYSTEM, METHODOLOGY, AND COMPUTER READABLE MEDIUM FOR PROVIDING CLOUD SERVICE BROKERAGE (CSB) PLATFORM FUNCTIONALITIES", having a common applicant herewith, and being incorporated herein in its entirety by reference.

FIELD OF THE DISCLOSURE

The disclosures made herein relate generally to cloud computing architectures and management methodologies and, more particularly, to implementing fulfillment of cloud services order including cloud services from a plurality of cloud service providers.

BACKGROUND

Cloud computing refers to the practice of using a network of remote servers hosted on a public network (e.g., the Internet) to deliver information computing services (i.e., cloud services) as opposed to doing so on a local server. The network architecture (e.g., virtualized information processing environment comprising hardware and software) through which these cloud services are provided to service consumers (i.e., a cloud service consumers) is referred to as "the cloud", which can be a public cloud (e.g., cloud services provided publicly to cloud service consumers) or a private cloud (e.g., a private network or data center that supplies cloud services to only a specified group of cloud service consumers within an enterprise), or a community cloud (e.g., a set of cloud services provided publicly to a limited set of cloud service consumers, e.g., to agencies with a specific State/Region or set of States/Regions), dedicated/hosted private cloud, or other emerging cloud service delivery models. The underlying intent of cloud computing is to provide easy, scalable access to computing resources and information technology (IT) services to cloud service consumers.

Cloud services can be broadly divided into four categories: Infrastructure-as-a-Service (IaaS), Platform-as-a-Service (PaaS), Software-as-a-Service (SaaS), and Managed Services. Infrastructure-as-a-Service refers to a virtualized computing infrastructure through which cloud services are provided (e.g., virtual server space, network connections, bandwidth, IP addresses, load balancers, etc). Platform-as-a-Service in the cloud refers to a set of software and product development tools hosted on the cloud for enabling developers (i.e., a type of cloud service consumer) to build applications and services using the cloud. Software-as-a-Service refers to applications that are hosted on and available on-demand by cloud service consumers via the cloud. Managed Services refers to services such as backup administration, remote system administration, application management, security services, etc. that are enabled by managed service providers for any cloud services.

In general, a cloud service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics, which applies specifically to public clouds as opposed to private or hybrid clouds, is that the service is fully managed by a cloud services provider (e.g., the services consumer only needs a suitably equipped client device and network connection). This third functionality is particularly relevant to public clouds. However, private clouds can be managed by an internal IT department or through ITO (IT Outsourcing) contracts. In these examples, I&O (Infrastructure & Operations) administrators act as the cloud provider and, accordingly, this third functionality would be of similar relevance.

The cloud is rapidly being adopted by business and IT users as a way to make their organizations more effective and to save costs. Along with this opportunity comes a new set of pain points and significant risks to enterprises that must be addressed. For example, business users are rapidly investing in their own cloud capabilities (e.g., IaaS, PaaS, and SaaS) to meet business needs while application developers want to move rapidly without the involvement of IT to provision tools and environments. These actions are creating a significant threat to IT management whom are worried about considerations such as, for example, managing costs, chargeback, capacity and resources from the result of unrestrained/unplanned cloud expansion.

A benefit of cloud computing is the ability for a cloud service consumer to procure cloud services from a plurality of cloud service providers. One approach for such procuring of cloud services is through a cloud service brokerage (CSB) platform. The CSB platform aggregates and integrates cloud services from a plurality of cloud service providers and serves as an intermediary between cloud service consumers and cloud service providers.

Although such aggregation and integrations of cloud services from a plurality of cloud service providers is highly beneficial, it presents a challenge with respect to effectively, efficiently and systematically fulfilling such cloud services because specific requirements for fulfillment can be dependent upon cloud service provider and/or cloud service. Furthermore, automated cloud service provisioning has become fragmented with individual development teams, DevOps teams, application teams and the like picking open-source, third-party, custom-built, and full cloud management tools. This has complicated the implementation of fulfillment processes across cloud service providers.

Therefore, implementing fulfillment of a cloud service order including a collection of cloud services that are procured from different cloud service providers in a manner that is effective, efficient and systematic would be beneficial, desirable and useful.

SUMMARY OF THE DISCLOSURE

Embodiments of the present invention are directed to implementing fulfillment of cloud services. More specifically, embodiments of the present invention are directed to implementing fulfillment of cloud services desired to be procured from a plurality of different cloud service providers by a particular cloud service consumer. In some embodiments, such cloud services can be ordered by way of a CSB platform through which cloud services from a plurality of cloud service providers are aggregated and integrated. Advantageously, embodiments of the present invention provide for implementing fulfillment of a cloud service order that includes a collection of cloud services that are procured from different cloud service providers in a manner that is effective, efficient and systematic.

Implementing fulfillment of cloud services in accordance with certain embodiments of the present invention beneficially provides for multi-cloud fulfillment via a centralized service fulfillment bridge (i.e., fulfillment bridge), distributed fulfillment agent architecture and expanded API gateway to the CSB platform. This gives enterprises the ability to offer continuous delivery of multi-sourced solutions at scale. The fulfillment bridge, distributed agent architecture, and expanded API gateway allow organizations flexibility to define and automate delivery of IT services across their unique system of providers and management tools while maintaining governance and security. The fulfillment bridge orchestrates delivery of services through any deployment tool following a defined process. The API Gateway (e.g., an Open, RESTful API service gateway) allows organizations to build fulfillment agents and adapters to connect existing service management tools and providers. The fulfillment bridge can include a multi-cloud fulfillment console that enables order tracking, unified view across multiple fulfillment technologies, and enable cloud service brokers to monitoring/troubleshoot fulfillment agents.

As a skilled person will appreciate from the disclosures made herein, embodiments of the present invention provide numerous benefits to cloud service providers, to cloud service consumers, and to cloud service brokers. One benefit to cloud service providers is that fulfillment agents configured in accordance with embodiments of the present invention can be written in any programming language thereby decoupling their programming language from the functionality they are required to provide. Another benefit to cloud service providers is that fulfillment agents configured in accordance with embodiments of the present invention can be fully or partially automated or manual, as necessary. Another benefit to cloud service providers is that fulfillment agents configured in accordance with embodiments of the present invention can be deployed anywhere in a network and managed independent of a system through which cloud services are offered (e.g., a CSB platform). Still another benefit to cloud service providers is that fulfillment agents configured in accordance with embodiments of the present invention can use any existing integrations and automations, thereby enhancing their simplicity and utility. Yet another benefit to cloud service providers is that fulfillment agents configured in accordance with embodiments of the present invention can be used to process many different service request types, thereby providing a one-to-many relationship with respect to cloud services with which a fulfillment agent can be associated. With respect to cloud service consumers, a benefit of embodiments of the present invention is that complex cloud services can be procured in a simple 'click to deploy' manner (e.g., fulfillment of cloud service orders including disparate cloud services from a plurality of cloud service providers). With respect to cloud service brokers, a benefit of embodiments of the present invention is that service fulfillment can be offloaded to the service providers, which allows respective parties to undertake activities in which they are most efficient and knowledgeable.

These and other objects, embodiments, advantages and/or distinctions of the present invention will become readily apparent upon further review of the following specification, associated drawings and appended claims.

BRIEF DESCRIPTION OF THE DRAWINGS

FIG. 3B is an illustrative view showing a resource solution center configured in accordance with an embodiment of the present invention.

FIG. 3C is a flow diagram view showing a method for fulfilling cloud service orders in accordance with an embodiment of the present invention.

DETAILED DESCRIPTION

Figure 1:
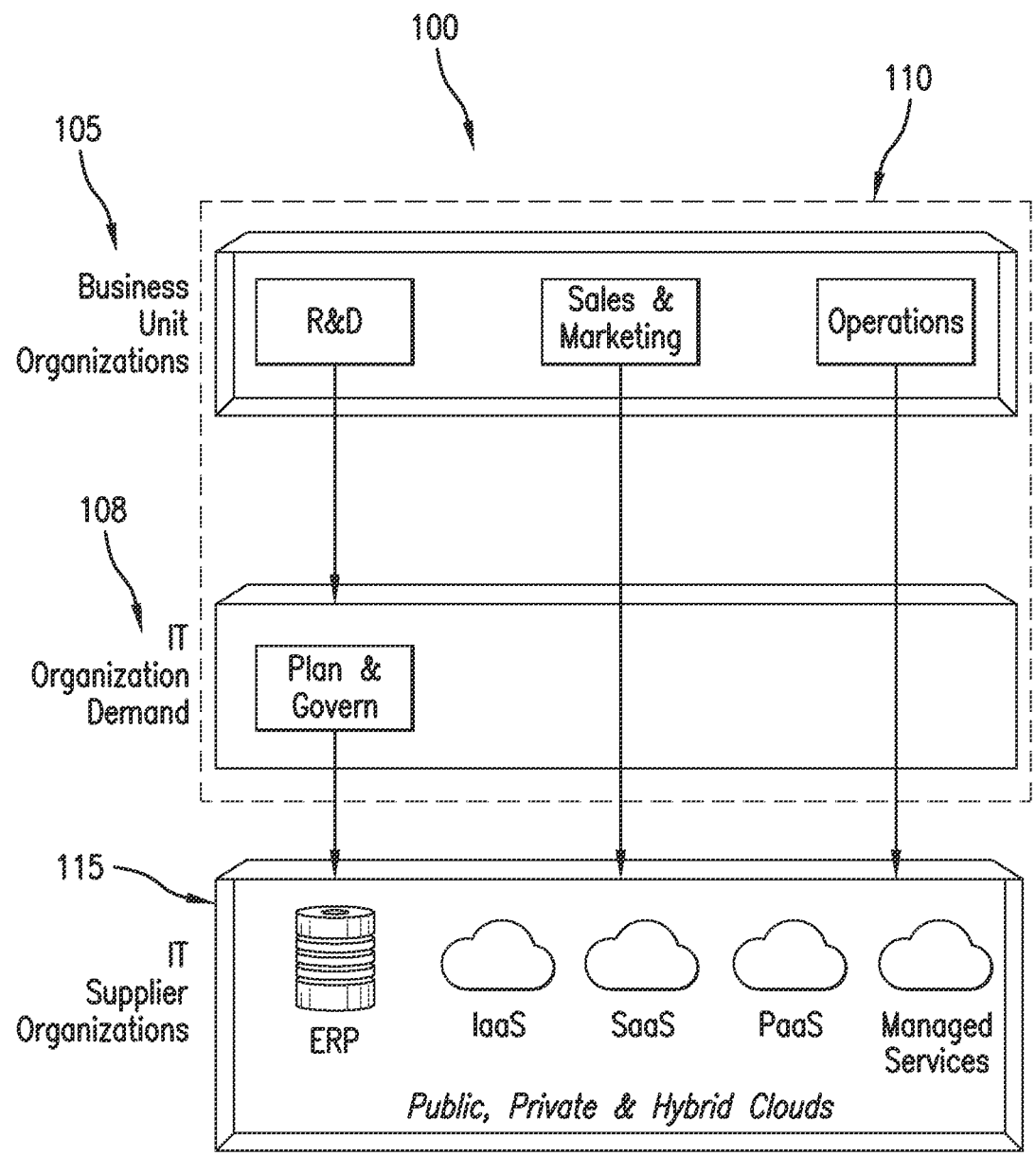
FIG. 1 is an illustrative view showing an example of a traditional cloud management model leading to cloud service users of a cloud service consumer directly implementing cloud services via cloud service providers.

FIG. 1 shows an example of a traditional (i.e., prior art) cloud management model 100 leading to business unit cloud service users 105 and IT organization cloud service users 108 (i.e., cloud service users) of a cloud service consumer 110 (e.g., a business, an institution, an individual or the like) directly implementing cloud services via cloud service providers 115 (e.g., IaaS, PaaS, SaaS, ERP, and MS available on one or more outside networks) without oversight and/or involvement of a centralized resource (e.g., IT management). ERP refers to enterprise resource planning and MS refers to Managed Services such as security, backup, monitoring and governance services offered by cloud service providers or a CSB platform provider (i.e., the entity that manages and administers the CSB platform). Examples of the cloud service categories include, but are not limited to, enterprises resource planning services, Infrastructure as-a-Service (IaaS), Platform-as-a-Service (PaaS), Software-as-a-Service (SaaS), and managed services.

There are numerous challenges and limitations in regard to implementing and managing cloud services that arise from the traditional cloud management model 100 discussed above in reference to FIG. 1. Examples of these challenges and limitations include, but are not limited to, different portions (e.g., user, entities, departments, etc) of a given cloud service consumer individually buying cloud services; different portions of a given cloud service consumer purchasing cloud services at different price points from the same cloud services provider; actions of different portions of a given cloud service consumer creating gaps in current business entity processes; disparate billing, payment, contract and settlement process for cloud services of a given cloud service consumer being created; IT interests of a given cloud service consumer being required to undertake actions such that it mimic a cloud service provider; existence of inconsistent service management and service-level-agreement (SLA) compliance across cloud service providers; and loss of effectiveness in implementing and managing cloud services due to broken processes across business, IT demand and supply organizations.

Accordingly, underlying problems that exists in cloud computing is that the need for intermediaries to aggregate, integrate or customize cloud services and that this need grows significantly as the number of cloud services and the rate of consumer adoption grows. Without such intermediaries being able to effectively and efficiently manage cloud services, cloud service consumers must manage numerous transactions (e.g., payments, governance, data movement, customization and enrichment) associated with their cloud service providers and cloud services. This can rapidly become a task that is difficult, time-consuming and expensive, especially when they are consuming numerous cloud services from independent providers. Furthermore, traditional approaches for managing cloud services leads to the adverse situation of vendor "lock-in" in which cloud service consumers are undesirably tied to a particular vendor or set of vendors for all or a portion of their cloud services. Therefore, a platform that enables cloud service consumers to manage these numerous transactions associated with their cloud service providers and cloud services in an effective and efficient manner, which includes implementing a cloud services catalog, would be beneficial, desirable and useful.

CSB Platform Architecture

Figure 2A:
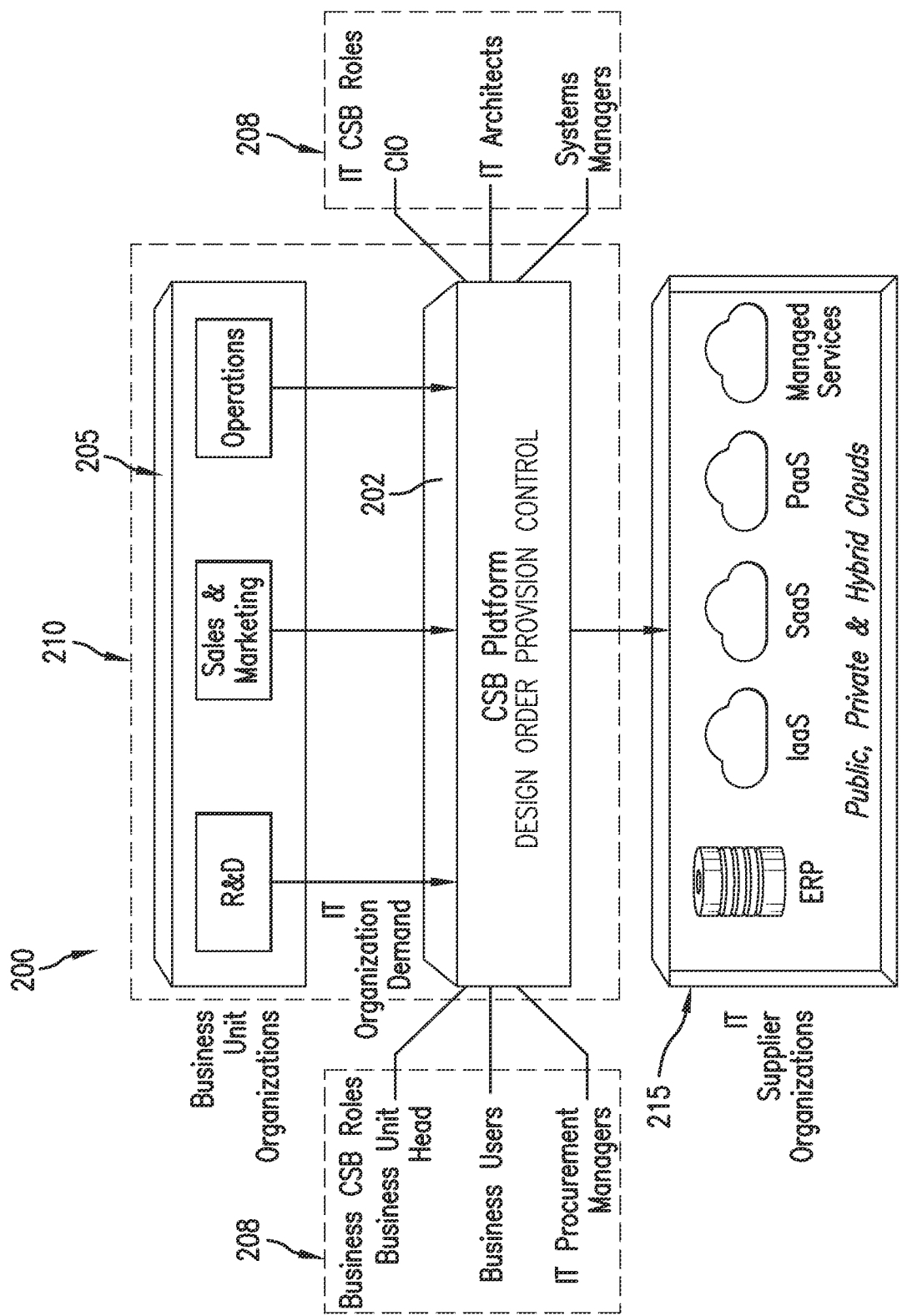
FIG. 2A is an illustrative view showing an example of a cloud management model configured in accordance with an embodiment of the present invention.
Figure 2B:
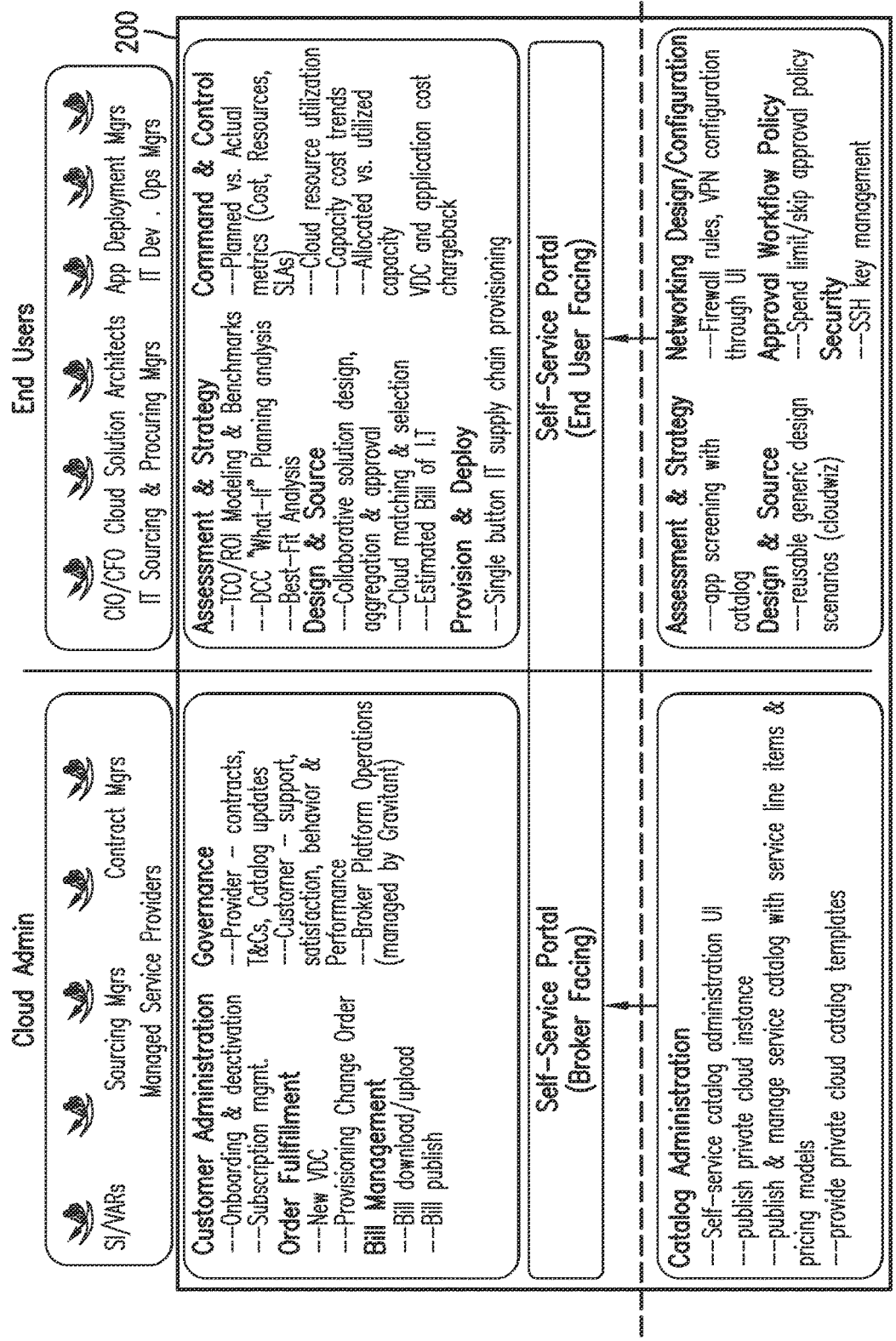
FIG. 2B is diagrammatic view showing a detailed implementation of the cloud management model of FIG. 2 as viewed from Cloud Administrator and End User perspectives.

Referring to FIGS. 2A and 2B, various aspects of a cloud management model 200 configured in accordance with an embodiment of the present invention are shown. Advantageously, the cloud management model 200 implements a CSB platform 202 through which business unit cloud service users 205 and CSB role cloud service users 208 (i.e., cloud service users) of a cloud service consumer 210 access cloud services via cloud service providers 215 (e.g., providing services via one or more outside networks with respect to the CSB platform 202). The CSB platform 202 enables cloud service users of the cloud service consumer 210 to enhance the manner in which it implements cloud consumption across public, private and hybrid clouds. For example, the CSB platform 202 enables cloud service users of the cloud service consumer 210 serving in an IT capacity (e.g., IT architects, system managers, information executives and the like) to limit the complexities and risks of implementing cloud services across multiple providers, allowing for increased agility, standardization of a cloud consumption model, formalization of accounting processes and implementation of compliance and governance.

The CSB platform 202 can be implemented in a variety of manners. In a first implementation, the CSB platform 202 is implemented in a manner where it enables an entity to be a trusted cloud service provider for its own customer base (i.e., its own cloud service consumers), to set up and manage secure virtual data centers with multiple cloud providers, and to add third party services such as security, monitoring and backup to build a more complete solution. In this first implementation, the CSB platform 202 serves as a single interface through which this users in customers with a single interface through which the cloud service consumers can design, order, provision, and manage not just cloud services but also traditional IT services have been provided to them in the past. In a second implementation, the CSB platform 202 is implemented in a manner where it enables an IT organization to maintain complete cost and SLA visibility and governance, while providing its users with a single interface through which they can design, order, provision, and control infrastructure and platform services from a myriad of public, private, hybrid and colocation providers.

The CSB platform 202 has a plurality of associated entities that directly or indirectly interact with it. Though the roles and responsibilities can vary for in certain implementations based on the needs of the specific brokerage, following is a summary of such entities. Broker refers to an entity that owns a cloud service brokerage. The Broker is responsible for contractual oversight of the brokerage, governance, and communication to agencies & consumers to facilitate and increase adoption. The Broker may take on additional roles that can be delegated to the Broker Operator. These additional roles are billing intermediary between broker operator and consumer agency and payment handling. Broker Operator refers to an entity that runs the business operations of the brokerage (e.g., billing management & invoicing, Provider agreements, SLAs and relationship management, pricing management, customer on-boarding including customer agreements, etc.) and technical services (e.g., federated help desk, new provider on-boarding, cloud architecture and design services, additional integrations and customizations, migration services, application management services, other managed services). Some of these roles may be a separate entity such as a System Integrator. For example, if the Broker chooses to manage the business operations and act as the Broker Operator, the Broker may choose to have a System Integrator or vendor perform the technical services. Brokerage Platform Operator refers to the entity that maintains and provides access to the CSB platform. Its responsibilities can include deployment, ongoing upgrades and release management, technical operations, level 3 support for the brokerage portal, etc. Cloud Service Provider refers to the entity that provides the requested cloud services, technical support for published APIs, monthly metering and billing, meet SLAs and provider terms, Level 3 support for provisioned resources, participate in critical problem triage and resolution processes, solution design review and approve (optional), etc. Cloud service consumer refers to an entity that is a register user on a portal of the platform. The Cloud Service Consumer manages users and access control through role assignments, sets spending limits and purchase orders, undertakes cloud architecture and solution design, accesses and uses provisioned resources, receives monthly bills, reviews bills and details through portal, pays bills, monitors performance using the performance dashboards/analytics for cost, capacity and utilization, etc.

Figure 3A:
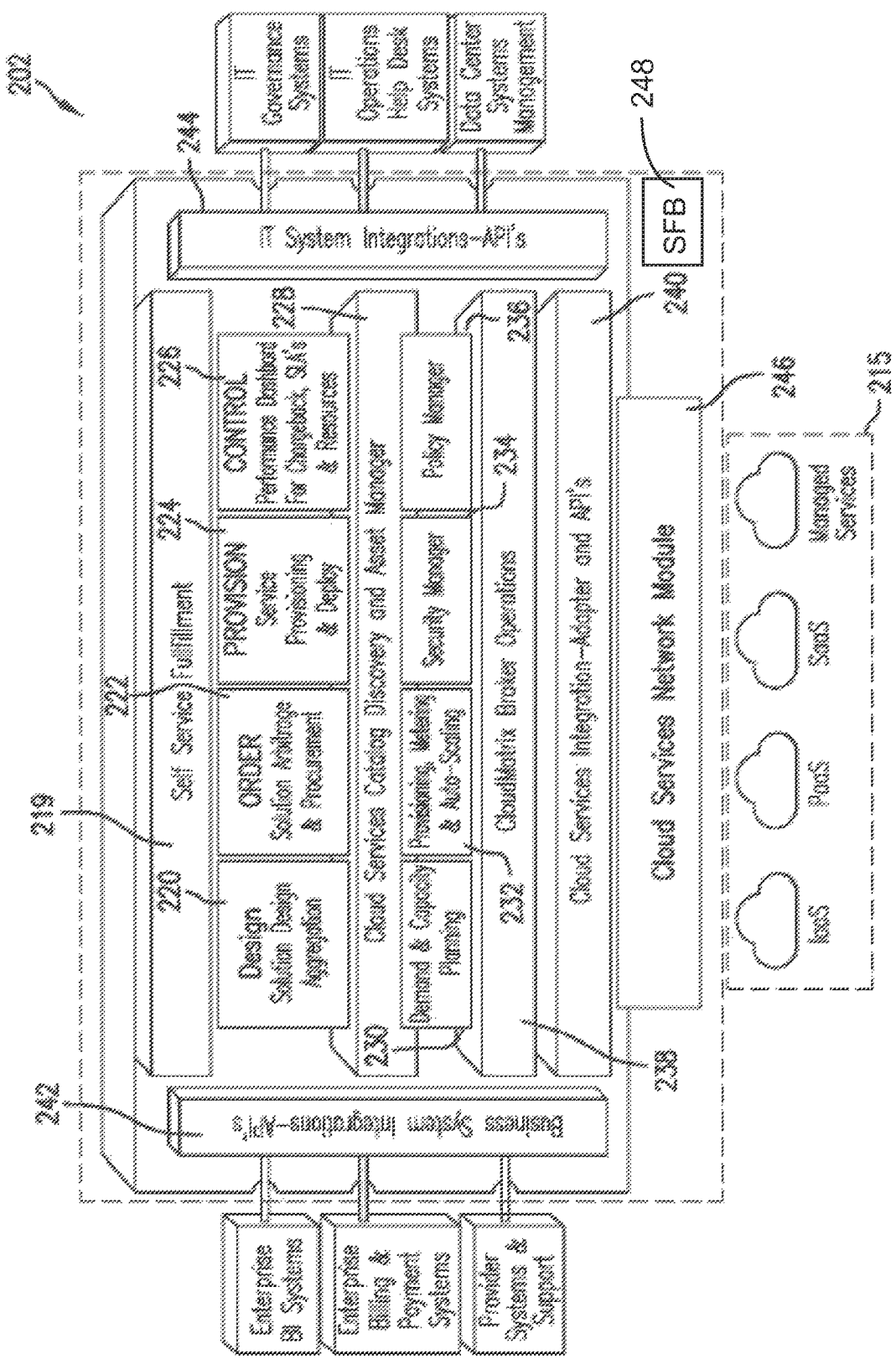
FIG. 3A is a functionality module view of a CSB platform configured in accordance with an embodiment of the present invention.

FIG. 3A shows a functionality module view of the CSB platform 202 (i.e., a CSB platform configured in accordance with an embodiment of the present invention). The CSB platform 202 serves as a cloud services brokerage and management platform that integrates multiple cloud provider services (e.g., internal or external) into a CSB platform portal through which cloud service consumers (e.g., business enterprises) can manage (e.g., optimize) the design, provisioning, ordering and control (i.e., consumption) of cloud services. One example of such a CSB platform portal is provided by Gravitant Inc. at the URL mygravitant.com. Cloud service consumers can deploy core services and features enabled by the CSB platform 202, which are described below in greater detail, through a single user interface of a cloud user accessible portal. These core services and features can be deployed independently or as an integrated suite of cloud services based on specific cloud service needs of a particular cloud service consumer. Advantageously, the CSB platform 202 is technology agnostic and will work and leverage current cloud platforms and business systems deployed of a cloud service consumer.

Advantageously, the CSB platform 202 offers numerous capabilities for allowing a cloud service consumer 210 to enable its cloud service users to implement (e.g., design, order, provision and control) cloud services across public, private and hybrid clouds. Examples of these capabilities include, but are not limited to enabling internal business and IT units to offer their cloud service users a single interface to design, order, provision and control virtual data centers (VDC) in public, private and hybrid infrastructure services; setting up a central environment for carrying out sourcing, procurement, fulfillment and billing processes and contracts with preferred public and private cloud providers; and tracking usage, chargeback, Quality of Service (QoS), SLA's and performance of internal and external cloud infrastructure service providers. Furthermore, the CSB platform 202 enables integration with current IT infrastructure and automation of investments made by a cloud service consumer. Still further, the CSB platform 202 includes a multi-cloud services catalog with services from available public cloud providers (e.g., Amazon, GoGrid, Terremark and Savvis). Accordingly, a cloud service consumer can use a private cloud catalog and service package template to quickly operationalize an enterprise CSB solution. Examples of template content, which are discussed below in greater detail, include service options relating to design and aggregation (i.e., cloud service designing); cloud service sourcing, arbitrage and procurement (i.e., cloud service ordering); service/user provisioning and deployment (i.e., cloud service provisioning); performance dashboards for chargeback, SLA's and resources (i.e., cloud service control); cloud services catalog and asset manager; cloud demand and capacity planning; provisioning, metering and auto-scaling; security management; policy management; broker operations management; cloud services integrations (e.g., adapters & APIs); business systems integrations (e.g., APIs); IT systems integrations (e.g., APIs); and cloud services networking.

In regard to the multi-cloud services catalog (i.e., the catalog), it is highly customizable. Self-service administrative capabilities (e.g., via the self-service fulfillment module 219) are available for the broker to perform actions such as, for example, setting up new cloud services, modifying existing cloud services, customizing the cloud service parameters, updating pricing, reclassifying services, and adding or removing providers. Broadly speaking, the catalog supports an abstraction of marketplace services and categorizations that then maps to provider specific catalog line items. In this regard, a cloud services catalog provides a service abstraction that can map to one or more provider services/line items. For example, a VM service on Savvis maps to vCPU, memory and local storage services with OS templates. For Terremark, Savvis, Amazon, Amazon Gov-Cloud, the aggregated VM services are pre-defined and published in the catalog. Additionally, attributes that are specific to cloud service consumers such as, for example, pricing rules, security and access constraints can be defined in the same catalog. This allows for a high degree of function and flexibility. For example, a consumer level service may be a packaged VM, which may translate into multiple provider catalog line items thereby significantly reducing complexity of the cloud for the consumer. This also simplifies maintenance as well as enables comparison of cloud services and plans from different providers. Accordingly, it will be appreciated that the CSB platform 202 can be configured with an integrated catalog and solution configurator that provides a unique capability to access services from providers that are required to enable a cloud service consumer solution. This integrated catalog and solution configurator provides transparency of provider capabilities and enables the customer to make the right choices from a technology, operational and management perspective.

The catalog has predefined metadata for service providers and services such as capacity limits, and allowed capacity configurations for CPU, memory, local storage, NAS storage etc. for different providers. These constraints are then applied at the time of solution design and Architecture. The total capacity being procured is also displayed to the user while the solution is being iteratively designed. If the predefined capacity limits are exceeded, warning and error messages can be displayed to the user as appropriate. With the ability for the cloud provider to have predefined capacity configurations such as specific vCPU sizes, specific RAM sizes, and storage blocks, it makes the catalog more end-users friendly and self-service. Through use of a catalog administration capability, an operator of the CSB platform 202 can update the metadata of the catalog to change the limits and predefined capacity configurations. For the cloud service providers already integrated into the CSB platform, these capacity configurations have already been defined as part of the content that is available as pre-configured selections.

FIG. 3B shows a resource solution center 221. The resource solution center 221 serves as a single point (e.g., one-stop) source for all of virtual resource service needs of a user of the CSB platform 202, in FIG. 3A. The resource solution center 221 correlates service catalog line items to an available cloud service selection (i.e., a resource context). Through the resource solution center 221, a user can identify and add infrastructure services such as, for example, shared storage and backup services; network services such as VPN; and managed services such as back-up administration and security management. Examples of infrastructure services include, but are not limited to shared storage (e.g., a cloud-based storage service for backup server software and shared backup storage) and a monitoring solution (e.g., a VM with system monitoring server software pre-installed and configured to send data to this portal for utilization and monitoring views). Examples of network services include, but are not limited to, VPN hardware (e.g., a hardware-based Virtual Private Network (VPN) solution that enables a Site to Site VPN managed by the VDC provider) and VPN software (e.g., software-based VPN solutions that allow for a lower cost secure VPN gateway and can enable Client to Site and Client to Site VPN). Examples of managed services include, but are not limited to, backup administration (e.g., services offered by IT operations service providers to configure backups, maintain backup schedules, monitor and verify backups, and restore backups as needed); system administration (e.g., services offered by IT operations service providers to setup, configure, and support cloud environments, including systems, virtual machines, storage, and networks); and security management (e.g., services offered by IT operations service providers to setup operational security policies, manage virtual private networks, and manage ongoing security, including audits and compliance).

Referring to FIG. 3A, a design module 220 of the CSB platform 202 enables (e.g., via a CSB platform access portal interface (i.e., part of the self-service fulfillment module 219) of the CSB platform 202) comprehensive cloud planning services (i.e., solution design and aggregation functionality). Cloud adoption scenarios can be simulated using prediction analytics for business applications and infrastructure resource needs. Demand, capacity, cost (TCO) and ROI baselines can be forecasted and established for each cloud solution and the internal and/or external cloud service platforms being used. Scenario dashboards can be saved and published and used to provide access to business organizations, IT resources, vendors and the like to align all parties on goals and implementation activities. Examples of information generated and tasks implemented using the design module 220 include, but are not limited to, visual architecture management; solution design and aggregation; application definition and management; and solution scenario design. Accordingly, a skilled person will appreciate that benefits of the design module 220 include, but are not limited to, accurately simulating and predicting cloud capacity and cost for a given application demand profile; clearly understanding cloud capacity needs and cost for each cloud provider before making investment decisions; running cloud consumption scenarios to understand cost, capacity and demand trade-offs/risks; accurately setting IT budgets for cloud computing projects; comparing cloud capacity, costs and SLAs across cloud provider offerings and platforms; clearly establishing and track ROI and TCO metrics for each cloud solution and project; and controlling and managing IT assets in the cloud and reduce cloud/virtual machines (VM) and subscription sprawl.

A virtual machine (VM) refers to a virtual computer that uses the resources of one or more real computers, but which is functionally indistinguishable from a physical computer running the same software from an end user's perspective. For example, in case in which there is a need to set up a new mail server, instead of buying a server (which may only actively process email 1% of the time), installing and configuring the mail server, configuring and maintaining networking for the server, and paying for the electricity and maintenance for the server, a cloud service consumer can pay a cloud service provider to set up a virtualized mail server. This server would run all the same software as the physical server, but would live in a VM that sits atop one or more physical servers which have (at a minimum) the same capabilities (CPU, memory, storage) as the local physical server necessary to run the same software. In turn, this same hardware used by the cloud service provider may support multiple other VMs, none of which use all the hardware system's resources. The cloud service users of the cloud service consumer would send and receive mail from this VM server exactly the same way they would if the server was physically located on premises of the cloud service consumer. In contrast, a virtual data centers (VDC) is similar to physical data centers. A VDC allows dynamic creation of virtual resources atop a physical infrastructure, including CPU, memory, storage, and network capacity. A VDC can be thought of as a container for a VM or as a server rack. Just as a server rack itself does not run any applications, a VDC does not itself run any applications; each is provisioned with servers (e.g., VMs) that run applications. VDC resources can be created on-demand and managed as a pool of virtual resources and controlled through an online user interface. Instead of ordering specific line items from a catalog, VDC is designed with capacity and/or virtual resources and then the system automatically generates an order for the provider to fulfill that VDC design. A VDC can be deployed on internal physical/virtual environments or in public clouds. A VDC can comprise of VMs, storage, one or more networks (subnets), VPNs, Firewalls, load balancers, and any other infrastructure as a service.

Still referring to FIG. 3A, the above-mentioned solution design and aggregation functionality implemented via the design module 220 often entails conducting an "apples-to-apples" comparison of cloud services from a variety of cloud service providers. However, quite often, each cloud service provider has a different style of presenting cloud services and resources to the end-consumer. At a high level, even their business models vary in the sense that certain providers employ reserved capacity vs. on-demand capacity methods of enabling a consumer to procure cloud resources. The CSB platform 202 is configured with a plurality of methods to perform such comparisons.

One method for performing such comparisons is through use of a cloud services planning wizard. An underlying component of the cloud services planning wizard is a metric parameter referred to as a Capacity Unit (CU), which is central to enabling precise cloud service comparative capabilities for measuring, comparing, metering and enforcing quality, performance and cost standards across cloud vendors for different cloud services. The CU is a generic unit of IT capacity that is a function of multiple factors such as, for example, processor speed, random access memory, storage, and bandwidth. In one specific implementation, 1 CU=the capacity to compute at a speed of 2.4 GHz with random access memory of 4 GB and local storage of 100 GB through 1 Mbps of bandwidth. It should be noted that the CU value scales differently with respect to each factor and its value intends to represent the effective realization of the individual capacity components.

By employing the cloud services wizard (which can include an application screener) to assess information derived from a knowledge base of information based on experience and best practices and to calculate CUs for various cloud service providers, the CSB platform user is guided towards an apples-to-apples comparison that results in the closest matched cloud services and cloud service providers. In at least one implementation, the cloud services wizard takes into account dimensions such as, for example, virtual machine dimensions (e.g., memory, CPU/vCPU, local storage, etc); network dimensions (bandwidth desired, virtual LAN, guaranteed throughput, pricing models, load balancers, public vs. private networks, etc); storage dimensions (e.g., defining different architectures, ability to snapshot storage, back up strategies for storage as well as offering shared storage, etc); security dimensions (e.g., firewalling technologies, intrusion detection/prevention technologies, etc); service level agreements (e.g., availability monitoring and service crediting); operating systems supported (e.g., employing templates with licenses, 32/64 bit operating systems, support for blank servers, virtual machines registered and compliant with certain operating systems, etc); provisioning times (e.g., for virtual machines, for provisioning the first virtual data center vs. subsequent virtual data centers, etc); support for virtual resources (e.g., varying from free, forum based support to full helpdesk support that is included for no additional fees); designation of location of virtual resources (e.g., geographic designation and specific locales based on CSP data center availability); and virtual resource pricing structure (e.g., varying by sizing of packages vs. individual resources that may vary by pricing model for reserved capacity vs. on-demand capacity).

Another method for performing such comparisons is through use of a service offerings comparator. By using a normalized scheme of small, medium and large cloud service packages (or other custom packages) of well-defined capacity including compute, storage and memory with normalized utilizations and allocation models, the CSB platform provides a quick pricing comparison for these multiple packages across cloud services and providers.

Still referring to FIG. 3A, the CSB platform 202 supports two models for creating and accessing accounts on the cloud service providers that it manages—Broker managed provider accounts and Customer managed provider accounts. The brokerage can be configured to support both models or either the Customer managed model or Broker managed model. In the broker managed provider accounts model, for example, a broker operations team creates accounts for each cloud provider and inputs the credentials to the portal based on customer (e.g., user) requests. Alternately, a broker can also have reseller relationships with the providers to have predefined accounts which can be set up in the system, and when a customer orders services, the broker simply assigns one of the predefined accounts to this customer. In the customer managed provider accounts model, for example, the customer may already have provider accounts or would prefer to directly create and manage the provider accounts. The customer sets up the account in CSB platform portal and provides the provisioning credentials, and billing credentials, if any. The brokerage portal can then perform all the functions such as catalog, solution design, order approval workflows, screening, provisioning, billing load by customer, cost allocation, dashboards, etc.

An order module 222 of the CSB platform 202 enables (e.g., via the CSB platform access portal) broker services enabling business and IT users the ability to engage with cloud service providers for building business and technology relationships (i.e., sourcing, arbitrage and procurement functionality). It offers a central point for a cloud service consumer to quickly aggregate cloud solutions, procure and pay for them by combining cloud services from different providers to meet business needs, cost constraints and innovation requirements. Examples of information generated and tasks implemented using the order module 222 include, but are not limited to, bill of materials estimates, advanced pricing rules, service offering comparators, provider account management, and procurement process flow. Accordingly, a skilled person will appreciate that benefits of the order module 222 include, but are not limited to, quickly setting up enterprise procurement portal(s) and streamlining cloud acquisition processes across business and IT organizations; meeting new business demand or scalability by having access to multiple cloud providers; ready access to cloud services from internal and external providers with integrated provisioning and procurement processes; being aligned with cloud market changes including product, pricing, packaging, and SLA changes from vendors; reducing cloud costs by comparing cloud service combinations for any given solution; performing real-time spend analysis across providers; optimizing as provisioning and de-provisioning systems are integrated with billing and order management; and reducing time and cost in billing, metering and payment management though a centralized bill and payment capability.

A provision module 224 of the CSB platform 202 enables (e.g., via the CSB platform access portal) cloud management services for users through a single view of cloud services resources from internal or external providers (i.e., service/user provisioning and deployment functionality). A cloud service consumer (e.g., an enterprise IT department) can use the provision module 224 to design application architectures and setup virtual data centers across multiple internal and external providers and manage it from one central location. Furthermore, cloud service consumers can create environments (e.g., Dev, Test, Production and DR) for a business application from different providers and manage them. Examples of information generated and tasks implemented using the provision module 224 include, but are not limited to, automated provisioning and deployment of IaaS and PaaS resource groups/clusters; workflow-based provisioning; auto-scaling service for one or more cloud service providers; and deployment workflow automation. Accordingly, a skilled person will appreciate that benefits of the provision module 222 include, but are not limited to, no vendor or technology lock in, rapid setup of virtual data centers and real time provisioning of IaaS, PaaS, SaaS, Managed Services and other cloud resources across multiple cloud providers, reduced cloud infrastructure costs by continuously optimizing utilization, enhanced resource availability for business applications to meet scalability and performance, enhanced cloud resource allocation to business application and business units, enabling customized cloud data center solutions by adding third party support services, and leveraging current investments in monitoring and management tools sets.

A control module 226 of the CSB platform 202 enables (e.g., via the CSB platform access portal) command and control services that are critical to successful adoption and acceptance of the cloud services model (i.e., dashboard functionality for chargeback, SLAs and resources). A cloud service consumer can gain visibility into current performance, cost and utilization of cloud services and compare against planning benchmarks/milestones to automatically initiate corrective action to continuously optimize cost, resources and SLAs to meet business demand and changes. Furthermore, a cloud service consumer can automatically track, define, establish, and report chargeback against business applications, business units, IT budget codes and/or shared resource categories. The provision module 224 includes a plurality of pre-configured dashboard views for chargeback, SLA's and resources. Examples of the pre-configured dashboard views include, but are not limited to, cloud analysis by virtual data center (VDC), application, customer, and business units/departments; capacity cost trends (e.g., compute, memory, network, managed services analysis of capacity vs. cost and trends over time); cost analysis (e.g., by resource type, environment and layer); capacity summary (e.g., allocated capacity, integrate with utilized capacity); cloud utilization & detailed utilization (e.g., monthly/daily utilization for avg/max of CPU/memory utilization and trends over time; aggregation of utilization data for cloud analysis by VDC, application, environment, layer, and resource groups; drill down to system monitoring tool; adapter based integration with any system monitoring tools; deployment template and provisioning for Xymon monitoring server/clients, and ability to deploy & provision other application and system monitoring technologies; and VDC and application cost chargeback); custom dashboards/reporting and activity logs for audit and tracking; and alerts (e.g., capacity changes, utilization thresholds, cost thresholds, and user access changes). Accordingly, a skilled person will appreciate that benefits of the provision module 222 include, but are not limited to, business and IT Management having visibility and control over the cloud infrastructures, costs, resources and SLAs; eliminating unrestricted/unintended spending with alerts, procurement and provisioning workflows; making more accurate investment decisions that continuously reduce cost and optimizes resource utilization; implementing proactive action on resource, SLA and cost alignment before there is an impact to business; auditing and reporting on all IT financial transactions, owned assets in the cloud by business app, business unit and shared IT resources; real time alignment of business, IT staff, resources, cost and performance; effective cost accounting and cost assignment to specific business units and apps; rapid enablement of IT initiatives for reducing the time between strategic planning and operational execution; continuous baselining of business and IT metrics; and establishing performance benchmarks.

A cloud services catalog and asset manager module 228 of the CSB platform 202 enables (e.g., via the CSB platform access portal) command and control services that are critical to successful adoption and acceptance of the cloud services model (i.e., cloud services catalog and asset manager functionality). Examples of information generated and tasks implemented using the cloud services catalog and asset manager module 228 include, but are not limited to, multi-provider catalog for IaaS, PaaS, SaaS, Managed Services, and Custom Services; extendable and customizable catalog with dynamic attributes and user interface; pricing support for different cloud provider pricing models (e.g., reserved capacity pricing, allocated capacity pricing and pay-as-you-go); manage provisioned assets (e.g., IaaS, PaaS, SaaS, managed and custom services, asset relationships, asset status and life cycle management, etc); automated asset discovery & sync (e.g., discover and make changes to assets in the cloud, sync with assets registered in catalog/asset manager, match process enabling the IT Administrator to resolve any discrepancies, match and compare prices in catalog for discovered assets, etc); and pre-configured content that is pre-populated with several provider offerings for rapid deployment.

A demand and capacity planning module 230 of the CSB platform 202 enables (e.g., via the CSB platform access portal) solution capacity modeling (i.e., cloud demand and capacity planning functionality). Examples of information generated and tasks implemented using the demand and capacity planning module 230 include, but are not limited to, planned vs. allocated vs. utilized capacity; standardized capacity units across cloud providers, cloud models and infrastructure; advanced and dynamic capacity planning (e.g., application capacity model and VDC capacity model; support for shared resources across VDCs, applications, environments and layers; capacity benchmarks using projected utilization profiles; capacity re-baseline using actual utilization data; modeling analysis of forecasted vs. available utilization thresholds for forecasting capacity growth needs, etc); demand planning with business driver-based demand modeling, drivers for normal demand growth or event-based; and integrated demand and capacity planning to update resource capacity and generate schedule or metric-based policies to change resource capacity based on capacity plan.

In regard to demand and capacity planning, the CSB platform (e.g., via the demand and capacity planning module 230) allows a cloud broker (e.g., platform operator) or the end customer (e.g., cloud service customer) to input demand profiles which then get applied to the solution design, and generate a capacity vs. demand curve (e.g., across an IaaS architecture). This enables cloud service consumers to incrementally acquire capacity as the demand grows instead of acquiring a lot of capacity that remains unutilized till the demand catches up. The CSB platform 202 also enables customization of the capacity planning to be tailored to specific customer architectural needs, and complex demand patterns.

A provisioning, metering and auto-scaling module 232 of the CSB platform 202 enables (e.g., via the CSB platform access portal) automated workflow based provisioning, integrated support for secure shell (SSH) based VMs, and deployment automation (i.e., provisioning, metering and auto-scaling functionality). Examples of automated workflow based provisioning include, but are not limited to, asynchronous message-based provisioning across multiple clouds simultaneously; handle and retry provisioning failures workflow to aggregate and manage underlying cloud provisioning task dependencies; hybrid workflow to support combination of automated and manual provisioning tasks; extensible workflow definitions that support custom integrations for Enterprise systems.

A security manager module 234 of the CSB platform 202 enables (e.g., via the CSB platform access portal) various security management functionalities related to cloud services. Examples of such security management functionalities include, but are not limited to, user security management with subscription and role-based access control that allows for multiple models of user security including user group support and password policy, single sign on and advanced security (e.g., support for integration with federated identity and access management systems, enterprise user directory integration, etc); user administration delegation to business units/departments; centralized and delegated user security administration; VPN services and firewall configuration support; VM encryption support across cloud providers; SSH key management for provider accounts, VDCs, and individual VMs; and support for Federal, Enterprise and other custom, high security deployments.

A policy manager module 236 of the CSB platform 202 enables (e.g., via the CSB platform access portal) implementation of various policies related to cloud services. Examples of such policies include, but are not limited to, pricing policies (discounts, upcharges, customer specific, partner specific, custom, etc); cost alerts based on thresholds; resource auto-scale policies (e.g., via support for a policy provider auto-scaling function); cost allocation policies by allocated and utilized capacity; architecture policies to enforce architectural constraints in solution design; and workflow/notification policies (e.g., email groups, portal tasks, order approvals, etc).

A broker operations module 238 of the CSB platform 202 enables (e.g., via the CSB platform access portal) implementation of broker operations related to cloud services. Examples of such broker operations include, but are not limited to, customer activations (i.e., on-boarding) and deactivation; customer subscription management (e.g., subscription packages and payment authorization); customer billing & payments with monthly bill export & import, bill lifecycle and publish, and credit card & purchase order support; brokerage command & control with visibility into cost, capacity & ordering behavior across providers & customers; customer support with integration and support ticketing systems; catalog implementation of services & providers, pricing rules, sourcing content, import SLAs and terms & conditions; channel/portal management with click-through agreements, white labeling/co-branding and affiliate management; and provider self-service with catalog & list price updates and visibility into customer behavior.

A cloud services integration module 240 of the CSB platform 202 enables (e.g., via the CSB platform access portal) implementation of cloud services integration functionalities (i.e., via adapters and application programming interfaces (API's)). Examples of such cloud services integration functionalities include, but are not limited to, pre-built jCloud API based adapters; built jCloud and REST API based adapters; support for custom adapters; adapters map to a common model for provisioning changes and asset discovery; metadata-driven configuration options enable dynamic UI for provider capabilities (e.g., memory, cpu, storage, OS templates); and map provisioning tasks to be automated or workflow-based.

A business systems integrations module 242 of the CSB platform 202 enables (e.g., via the CSB platform access portal) implementation of business systems integration functionalities (i.e., via API's). Examples of such business systems integration functionalities include, but are not limited to, APIs for business intelligence systems (e.g., resource capacity/cost/utilization for provisioned resources; catalog data, asset inventory data and orders; and the like); enterprise billing & payment systems that provide APIs for enterprise billing & payment systems to retrieve and update data for bills, orders and assets; and APIs for cloud service providers to manage catalog & list prices, terms and conditions for provider services and visibility into customer activity and behavior.

An IT systems integrations module 244 of the CSB platform 202 enables (e.g., via the CSB platform access portal) implementation of IT systems integration functionalities (i.e., via API's) related to internal IT governance, internal IT operations help desk systems, and internal data center systems management. Examples of such IT systems integration functionalities include, but are not limited to, providing APIs for enterprise governance systems to view order access and complete workflow tasks, review tickets/support, terms and conditions with SLAs; monitoring and auditing data for cost, capacity and utilization of resources; providing APIs for Help Desk systems to view, edit, submit and run reports on support tickets; providing APIs for enterprise systems management integration; and monitoring data for cost, capacity, and utilization of resources.

A cloud services network module 246 of the CSB platform 202 enables (e.g., via the CSB platform access portal) implementation of cloud services networking functionalities. Examples of such cloud services networking functionalities include, but are not limited to, pre-defined CSB service taxonomy (e.g., hierarchical); pre-loaded catalog(s) (e.g., for cloud providers, private clouds, security services, network services, managed services; pre-built adapters for available cloud service providers; pre-defined provisioning workflows for all services pre-loaded in the catalog(s); sourcing comparator content for cloud service provider offerings; pre-defined subscription packages; user roles and dashboards; pre-defined email templates for user registration, provisioning status, order status & process steps, alert notifications, and task notifications; and pre-built integration for support.

Still referring to FIG. 3A, the CSB platform 202 includes a service fulfillment bridge (SFB) 248 (also referred to herein as the fulfillment bridge). The fulfillment bridge 248 is a 2-way bridge that transfers information from cloud service orders to fulfillment agent and that enables transfer of completion information and posting of relevant information about the fulfilled cloud service back to the order and the cloud service consumer (or broker) that placed the order. Examples of the relevant information include, not limited to, asset identifying information, end-user access URLs, login names, or other such information. In this respect, as discussed below in greater detail, the fulfillment bridge 248 enables transfer of provider account information to fulfillment agents for provisioning the correct provider and to the proper account with that provider for enabling appropriate charges and allocation of charges to the cloud service consumer requesting the cloud service. Advantageously, this enables a single fulfillment agent to fulfill one or more services from varying providers as well as for many customers.

The fulfillment bridge 248 ensures that orders are processed and supports scalability of deployment. Thus, with the addition of more servers, more order fulfillment jobs can be processed in parallel. Scalable and guaranteed job execution is beneficial because it allows many customers to request multiple orders to be fulfilled in parallel through a single instance of the CSB platform 202.

The fulfillment bridge 248 can include a fulfillment console (i.e., a user interface) for enabling fulfillment operators to interact with the fulfillment bridge 248 and other components that the fulfillment bridge 248 orchestrates such as, for example, the fulfillment agents, and orders. In this manner, the fulfillment console enables fulfillment operators to view status, diagnose fulfillment errors, retry provisioning, cancel services, edit the orders, etc. In a specific example of use, the fulfillment console will enable cloud service brokers to monitoring/troubleshoot fulfillment agents.

As discussed below in greater detail, fulfillment agents are responsible for receiving approved order requests for a specific type (s) of service from the fulfillment bridge, provisioning the orders either directly or through other automation engines and responding back to the CSB platform with status, log and/or asset information pertinent to the provisioned asset(s). Furthermore, information present at an order fulfillment system through which the fulfillment agent implements cloud service fulfillment can be passed from the fulfillment agent back from the service fulfillment bridge to the CSB platform (e.g., via the service fulfillment bridge). Examples of such information include, but are not limited to, output parameters (e.g., IP addresses, URLs of the provisioned service assets, etc), logs (e.g., informational, warning and error messages of the fulfillment agent), status information, etc.

Preferably, the fulfillment agent is an independent entity (e.g., separately deployed and running separately from the CSB platform) that implements a standardized REST based interfaces published by the CSB platform. This arrangement enables a distributed orchestration capability across multiple cloud management and provisioning (i.e., automation) engines.

With respect to provider account information, enabling the link between ordering and provisioning is the provider account details that ensure that multiple consumers can use the fulfillment agents and also enables the tie-back for billing & chargeback. The CSB Operator can setup and assign a provider account (or accounts) with e.g., Amazon or Azure or other cloud provider(s) and associate to specific end-user groups. This set up and association can be done prior to onboarding the end-user group, or at the time of ordering, or after the order is placed to the CSB Operator to be fulfilled. Optionally, the end-user can register their own provider accounts established directly between the end-user and the cloud provider. This information includes the identifying information, credentials that can be used by the CSB or fulfillment agents for provisioning, as well as other pertinent information such as billing information. The fulfillment bridge passes the needed information for the order to the fulfillment agent, which then can use secure APIs to retrieve the provider account details. This allows the Fulfillment Agent to be able to provision orders from various end-user groups without limitation across departments, business units, or Companies.

The fulfillment bridge 248 can orchestrates various types of fulfillment that fall generally into three categories of fulfillment: CSB platform based automated provisioning, external automated provisioning, and manual workflow provisioning. CSB platform based automated provisioning refers to a type of fulfillment in which provisioning workflows are built into the CSB platform (e.g., a fulfillment bridge thereof) for provisioning virtual machines and related assets. Rules and adapters for this type of fulfillment are offered as part of the CSB platform (i.e., the CSB product) and are maintained by an operator of the CSB (i.e., brokerage administrator) when a service provider's APIs or provisioning instructions change.

External automated provisioning refers to a type of fulfillment in which fulfillment services are automated through the fulfillment agents such as, for example, those described herein. This enables the CSB platform (e.g., a fulfillment bridge thereof) to orchestrate the order business process and manage automated fulfillment operations across disparate provisioning methods including open-source as well as proprietary technologies. A customer (e.g., cloud service consumer) may choose to use best-of-breed technology for a specific service or service packages. New IT services can also be introduced and automated using this fulfillment method.

Operator fulfillment refers to a type of manual workflow provisioning used to fulfill services that cannot otherwise be fulfilled automatically. For example, some services cannot be fulfilled automatically either because a respective vendor system does not provide this capability or because the cost of automation is prohibitive and does not provide enough ROI. In support of operator fulfillment, the CSB platform can create workflow tasks that can be implemented by fulfillment operator personnel. The order is still 'automated' from the order submitter (end-user) perspective, even though the order fulfillment required attention of fulfillment operator personnel.

VDC fulfillment refers to another type of manual workflow provisioning that typically requires manual intervention of an operator to go to a cloud provider console and set up different configuration elements based on provider instructions. This may include, for example, setting up networking, security credentials, creating new accounts or subscriptions on the provider. Once completed, the fulfillment operator provides the information to CSB platform (e.g., a fulfillment bridge thereof) by 'completing' the VDC service such as network mapping, provisioning credentials, and the like.

Referring now to FIG. 3C, a detailed embodiment of a method 290 for implementing order fulfillment of the cloud services is discussed. The method 290 can be performed by a service fulfillment bridge configured in accordance with an embodiment of the present invention. The method 290 begins with an operation 291 of accessing a cloud service order is performed, followed by an operation 292 of determining a suitable order fulfillment mode for fulfilling a particular cloud service in the cloud service order being performed. If it is determined that the cloud service requires external fulfillment (e.g., by a $3^{rd}$ party fulfillment, independently operated service order fulfillment system, and the like), an operation of invoking a corresponding fulfillment agent for fulfilling cloud service is performed. If it is determined that the cloud service can be auto-provisioned (e.g., cloud service corresponds to a CSB platform supported service provider), an operation 296 of initiating auto-provisioning of the cloud service (e.g., by the CSB platform) is performed. Otherwise, an operation 298 of outputting workflow tasks for manual fulfillment of the cloud service is performed. The method 290 thereafter continues at the operation 290 of determining the fulfillment mode for each other cloud service in the cloud service order. If there are no remaining cloud services to be processed the method 290 ends.

Examples of order fulfillment modes include a fulfillment mode where a fulfillment agent performs fulfillment without the need for human intervention and a fulfillment mode where such fulfillment is performed in a manner that requires human intervention (i.e., a human performing one or more actions for fulfilling the particular cloud service). An external system-automated agent (e.g., $3^{rd}$ party fulfillment agent) that facilitates fulfillment is an example of a fulfillment mode that performs fulfillment without the need for human intervention. Auto-provisioning of a service from within a CSB platform for service providers supported by the CSB platform is another example of a fulfillment mode that performs fulfillment without the need for human intervention. Examples of fulfillment modes that require human intervention include, but are not limited to, cloud services that require manual implementation of workflow tasks for fulfillment (e.g., by a broker and/or brokerage operator).

In view of the disclosures made herein, a skilled person will understand that a CSB platform configured in accordance with the present invention (e.g., a service store thereof) can include an interface (e.g., a "service fulfillment bridge interface") through which multiple cloud services in a cloud service order from different cloud service providers are fulfilled. The fulfillment bridge interface connects to a fulfillment bridge that implements an appropriate fulfillment agent for each cloud service in a cloud service order that is determined to be capable of being fulfilled by a fulfillment agent. To this end, when a cloud service order is generated, after the approvals are obtained, each cloud service in the cloud service order is fulfilled. If a particular cloud service is indicated as being fulfilled via the service fulfillment bridge, then the service fulfillment bridge interface enables fulfilling of that particular cloud service by passing relevant information to the service fulfillment bridge (e.g., the associated fulfillment agent thereof). In this respect, the service fulfillment bridge acts as a facilitator to implement fulfillment of suitably configured cloud services.

In view of the disclosures made herein, a skilled person will understand that a CSB platform configured in accordance with the present invention (e.g., a service store thereof) can include an interface (e.g., a "service fulfillment bridge interface") through which multiple cloud services in a cloud service order from different cloud service providers are fulfilled. The fulfillment bridge interface connects to a fulfillment bridge that implements an appropriate fulfillment agent for each cloud service in a cloud service order that is determined to be capable of being fulfilled by a fulfillment agent. To this end, when a cloud service order is generated, after the approvals are obtained, each cloud service in the cloud service order is fulfilled. If a particular cloud service is indicated as being fulfilled via the service fulfillment bridge, then the service fulfillment bridge interface enables fulfilling of that particular cloud service by passing relevant information to the service fulfillment bridge (e.g., the associated fulfillment agent thereof). In this respect, the service fulfillment bridge acts as a facilitator to implement fulfillment of suitably configured cloud services.

Figure 4:
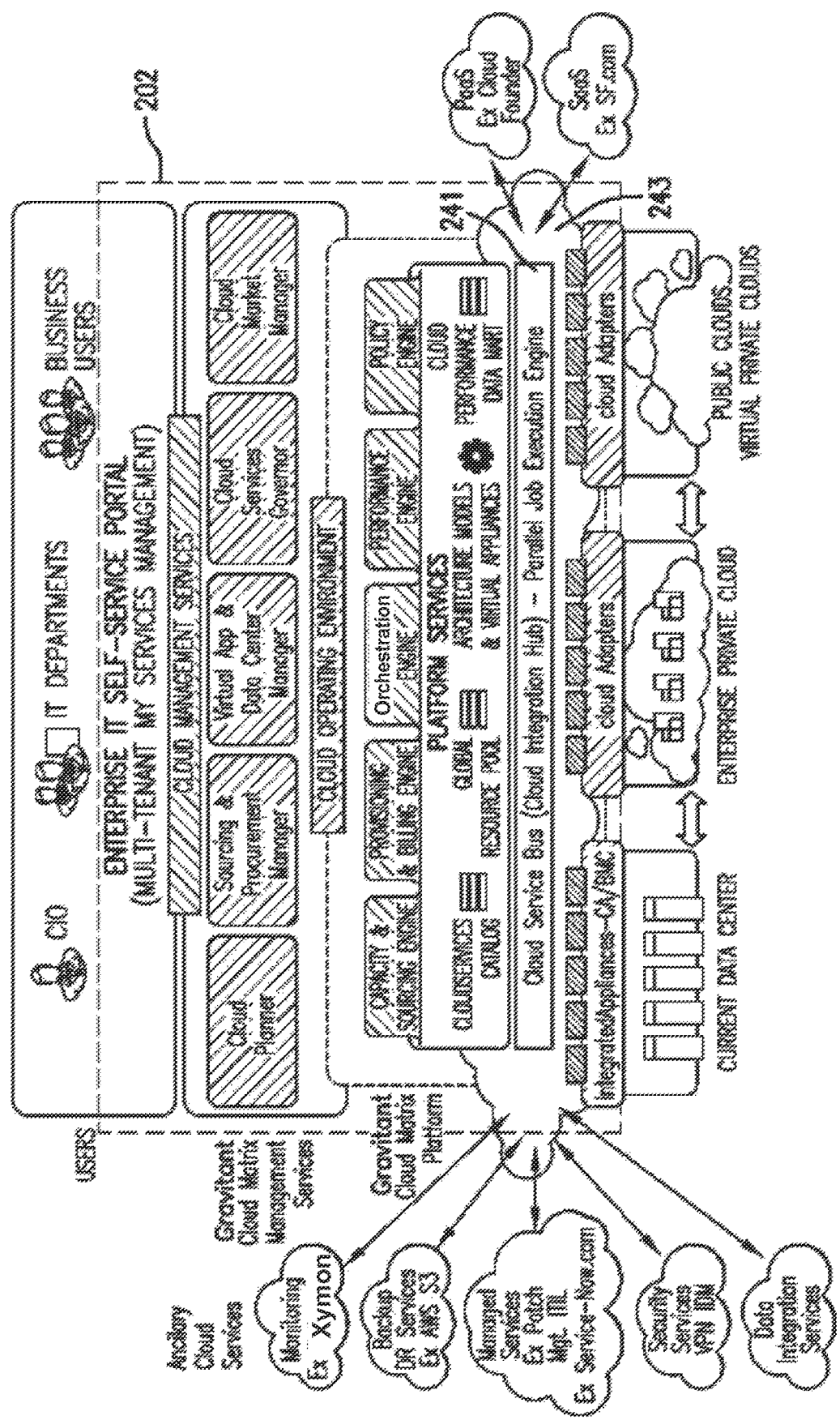
FIG. 4 is an illustrative view showing high-level functionality of the CSB platform of FIG. 3A.

Referring to FIG. 4, further details of the cloud services integration module 240 of the CSB platform 202 are presented. The cloud services integration module 240 shown in FIG. 3A comprises a unique and comprehensive service bus architecture for the provisioning capabilities. This service bus architecture is embodied by the cloud service bus 241, which is coupled to outside network 243. The cloud service bus 241 has an inbuilt data driven workflow/process engine that supports multiple workflow/process definitions for different services, service providers and/or service types. The cloud service bus 241 uses an adapter architecture pattern to integrate with service providers. The cloud service bus 241 is a message-based architecture that allows asynchronous and parallel execution of provisioning tasks across cloud services and cloud service providers. These provisioning adapters are separate 'classes/libraries' that implement specific provisioning APIs at the level of each operation mapped to the provider API. The adapter classes are implemented using the Interface design pattern. The cloud service bus 241 supports multiple adapter invocation approaches including standard web service protocols and REST API protocols, as well as custom approaches depending on the service provider capabilities.

The cloud service bus 241 can use standard open-source JClouds (jclouds) protocol that currently has provisioning integration enabled for about 30 cloud providers. The cloud service bus 241 workflows invoke jclouds protocol libraries using service provider metadata and credentials configured in the catalog discussed above (i.e., the service catalog).

The architecture of the cloud service bus 241 and the adapter pattern support several standards such as, for example, VMWare vCloud Director APIs, OpenStack APIs, AWS APIs, jclouds APIs, Eucalyptus APIs and CloudStack APIs. The cloud service bus 241 provides the unique ability to interoperate with emerging and changing standards with the cloud, and normalize across them from a consumer perspective. Many of these standards are focused on cloud provider's ease of management of multiple cloud technologies.

Users of the CSB platform 220 can design their virtual data centers through a visual user friendly console. Once the design is finalized, it goes through an authorization workflow, followed by an approvals process that is all fully automated through the CSB platform 220. Such an authorization workflow is critical to maintain complete control of the procurement process. Otherwise, resources may be ordered and provisioned randomly without proper protocol leading to rogue virtual machines and virtual machine sprawl. Next, all the virtual resources are simultaneously provisioned across multiple providers through the cloud services integration module 240, which has API connections to the different cloud service providers. Accordingly, cloud service consumers do not need to create accounts and communicate with multiple providers for their cloud requirements because this will be done for them automatically by the cloud services integration module 240. This level of automation also allows for easy movement of workloads between cloud service providers.

Figure 5:
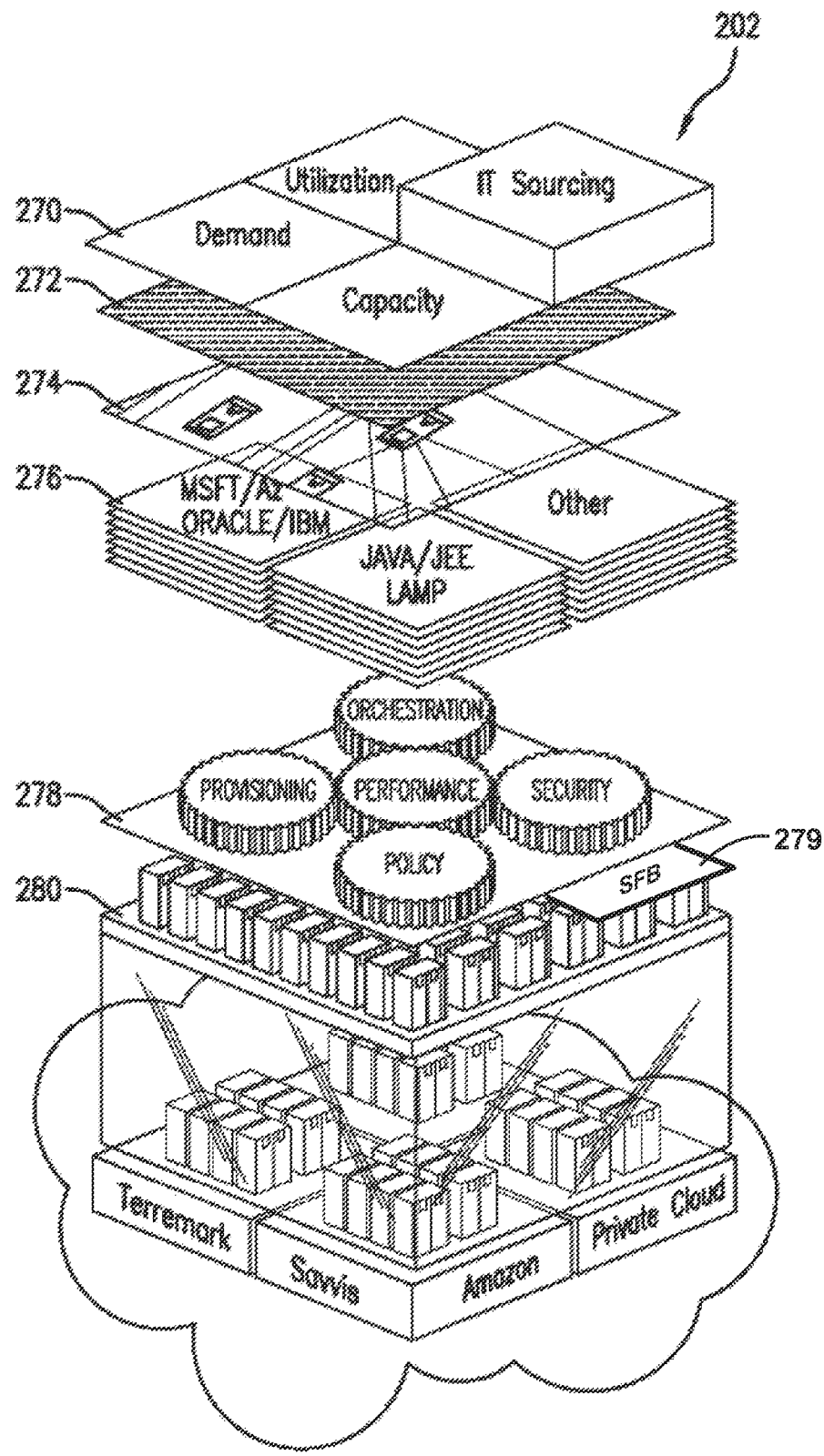
FIG. 5 is an architectural view showing various engines providing functionality the CSB platform of FIG. 3A.

FIG. 5 shows an architectural view of the CSB platform 202. The architecture of the CSB platform 202 enables cloud brokerage services to be delivered in a manner that provides advantageous and beneficial results. As is discussed below in reference to the various platform engines of the CSB platform 202, the architecture of the CSB platform 202 employs advanced simulation and optimization mathematical models for IT planning, sourcing, and governance.

A set of cloud decision and governance engines 270 of the CSB platform 202 is configured to simulate and optimize trade-offs between cloud service criteria such as, for example, business demand, resource capacity, utilization/performance, and IT sourcing policies. The set of cloud decision and governance engines 270 enable the analysis of impacts to cloud service parameters such as, for example, cost, risk, QoS, SLAs, and application architecture for business services and applications. Based on these analyses, IT organizations and/or other entity(ies) of a cloud service consumer can make decisions on preferred cloud service providers to use, on the optimal cloud service capacity to deploy, and on the policies for automated scaling of capacity based on business demand. Thereafter, an IT organization and/or other entity(ies) of a cloud service consumer can govern the operations and compliance of these decisions through on-going tracking and analysis against a defined plan.

A cloud services catalog engine 272 of the CSB platform 202 is configured to manage a comprehensive model of public/private cloud services supply and business services demand of the cloud service consumer's. An administrative entity that manages back-end operability of the CSB platform 202 (i.e., the various platform engines thereof) works with many cloud service providers to model their individual cloud services and purchase-able line items with pricing and packaging structures. The cloud service consumer (e.g., its IT Organizations) can then define their business services and model demand for cloud services based on available services in a catalog of cloud services that are available from the cloud service providers (i.e., a CSB cloud services catalog). The cloud service consumer (e.g., its IT Organizations) can also define a custom catalog of preferred suppliers (e.g., a CSB cloud service provider catalog that can comprise the CSB cloud services catalog) to help manage their sourcing policies and setup a private marketplace.

A cloud performance data mart engine 274 of the CSB platform 202 is configured to automatically aggregate and correlate metrics for cloud service criteria such as, for example, demand, capacity, utilization, performance, cost, and risk for multiple application architecture and cloud resources across many environments and virtual data centers. The cloud performance data mart engine 274 enables near real-time visibility into resource performance along with audit data to manage governance of resource changes. Using a suitable performance data model, the system can scale to support thousands of resources with historical data and deliver instant reporting.

An application architecture manager engine 276 of the CSB platform 202 is configured to define application architecture blueprints using virtual appliances (e.g., templates) and associated resource capacity models to automate system construction, deployment, configuration and maintenance across physical, virtual and cloud environments. Also, the application architecture manager engine 276 enables orchestration and transaction-based automated provisioning of cloud resource changes.

A set of cloud architecture engines 278 of the CSB platform 202 provides a common set of architecture services to intelligently scale, monitor, and secure applications running across multiple cloud environments and internal data centers. The cloud architecture engines 278 provide the foundation, logic, and integrations to enable automated resource provisioning, performance management, orchestration and workflow, policy models, and security controls.

A global cloud resource pool and cloud service provider engine 280 of the CSB platform 202 is configured to create, manage and control VDC's by provisioning resources from multiple external cloud service providers, private clouds and internal data centers. All resources are inventoried globally across providers and manageable through a single unified interface. Cloud service providers are integrated into the CSB platform 202 through common interfaces (e.g., for connectors of VDC's and connectors of cloud managed services).

In view of the disclosures made herein, a skilled person will appreciate that a CSB platform configured in accordance with the present invention offers several distinguishing aspects with respect to traditional approaches for enabling a cloud services to be implemented by a cloud services consumer. One such distinguishing aspect relates to CSB functionality being configured for meeting end user cloud service consumption use cases integrated with governance use cases for IT and business managers. In this regard, such a CSB platform is configured to operate and scale across multiple agencies and internal/external cloud service providers communities in a centralized or federated deployment model. Another such distinguishing aspect relates to CSB platform being model driven and based on XML semantic ontologies. This avoids lock in for end customers while providing quick extensibility and integration with customers and cloud providers systems. Furthermore, the CSB platform includes integrated analytics and policy management for intelligent resource usage, SLA compliance, and cost optimization thereby allowing cloud service consumers to run predictive IT operations to optimize utilization cost and SLA across an IT supply chain. Yet another such distinguishing aspect relates to CSB platform being able to be deployed (i.e., onsite or offsite) in multiple configurations where an operator of the CSB platform can be an agency or a preferred service integration provider. Additionally, the processes implemented via the CSB platform inter-operate with service management and governance processes of other entities, which enables a staged extension of a non-broker-based operations model to a broker-based operations model.

Service Fulfillment Bridge Details

Figure 6:
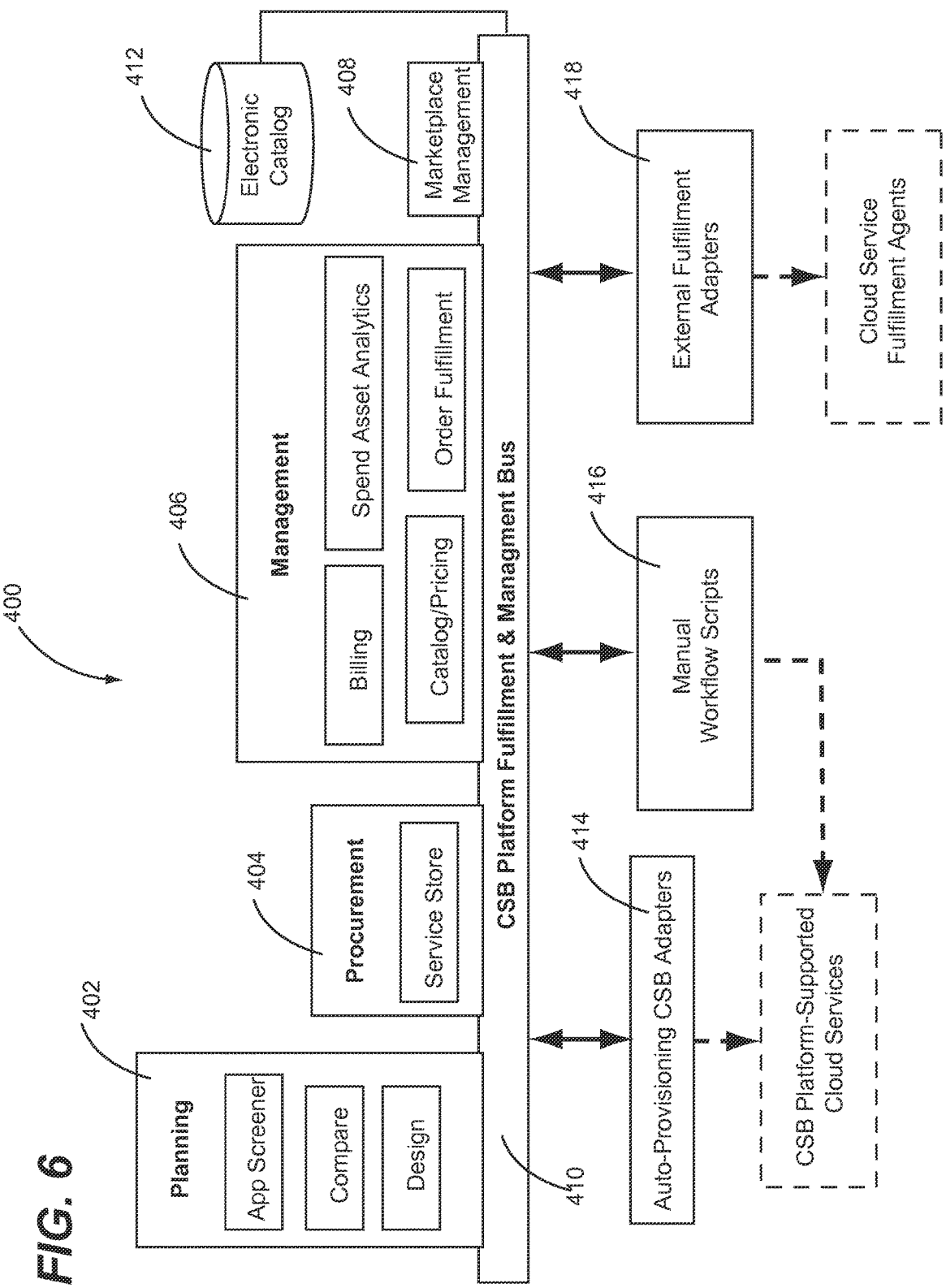
FIG. 6 is a block showing a service fulfillment functional architecture configured in accordance with an embodiment of the present invention.

FIG. 6 shows a service fulfillment functional architecture 400 configured in accordance with an embodiment of the present invention. The service fulfillment functional architecture 400 provides for planning, procurement and management of cloud services. In preferred embodiments, functionality of the service fulfillment functional architecture 400 is provided by one or more integrated functional modules of a cloud service brokerage platform such as, for example, the integrated functional modules of the CSB platform 202 discussed above in reference to FIG. 3A. Dotted lines in FIG. 6 represent structure that is external to a preferred implementation of a platform that includes the service fulfillment functional architecture 400.

Referring to the service fulfillment functional architecture 400 in FIG. 6, a planning functionality module 402, a procurement functionality module 404, a management functionality module 406, and a market place management functionality module 408 are coupled to each other through a fulfillment and management bus 410. An electronic catalog 412 is coupled to the planning functionality module 402, the procurement functionality module 404, the management functionality module 406, and the market place management functionality module 408 through the fulfillment and management bus 410. Auto provisioning adapters 414, manual workflow scripts 416, and external fulfillment adapters 418 are coupled to the fulfillment and management bus 410. The fulfillment and management bus 410, the auto provisioning adapters 414, the manual workflow scripts 416, and the external fulfillment adapters 418 jointly define a service fulfillment bridge, which is discussed below in greater detail.

Examples of functionalities provided by the planning functionality module 402 include, but are not limited to, application screening functionality, cloud service compare functionality and solution design functionality. Specific disclosure on application screening functionality can be found at paragraphs 00105-00123 in U.S. patent application Ser. No. 14/199,956, which is incorporated herein in its entirety by reference. Disclosure relating to cloud service compare functionality can be found at paragraphs 00126-00131 in U.S. patent application Ser. No. 14/175,679, which is incorporated herein in its entirety by reference. Disclosure relating to solution design functionality can be found at paragraphs 00132-00147 in U.S. patent application Ser. No. 14/175,679, which is incorporated herein in its entirety by reference. An example of functionalities provided by the procurement functionality module 404 includes, but is not limited to, cloud service store functionality. Disclosure relating to cloud service store functionality can be found at paragraphs 00152-00165 in U.S. patent application Ser. No. 14/868,164, which is incorporated herein in its entirety by reference. Examples of functionalities provided by the management functionality module 406 include, but are not limited to, billing functionality, catalog and pricing functionality, spend and asset analytics functionality, extended integrations functionality, and order fulfillment functionality. Disclosure relating to billing functionality can be found at paragraphs 00171-00177 in U.S. patent application Ser. No. 14/175,679, which is incorporated herein in its entirety by reference. Disclosure relating to catalog and pricing functionality (including an embodiment of the electronic catalog 412) can be found at paragraphs 00164-00170 in U.S. patent application Ser. No. 14/175,679, which is incorporated herein in its entirety by reference. Disclosure relating to spend and asset analytics functionality can be found at paragraphs 0082-0095 in U.S. patent application Ser. No. 14/324,213, which is incorporated herein in its entirety by reference. Detailed disclosure pertaining to order fulfillment, which is the subject of embodiments of the present invention, is presented below. The marketplace management functionality module 408 provides for backend functionalities such as those that would be utilized by a cloud service broker (e.g., publishing of cloud services in a cloud service store).

Examples of the fulfillment and management bus 410 include, the cloud services network module 246 discussed in reference to FIG. 3A and the cloud service bus 241 discussed in reference to FIG. 4. More specifically, as it relates to embodiments of the present invention and discussed in reference to FIGS. 3A and 4, the fulfillment and management bus 410 supports multiple workflow/process definitions for different services, service providers and/or service types via pre-built adapters for available cloud service providers and pre-defined provisioning workflows. The fulfillment and management bus 410 uses a message-based architecture that allows asynchronous and parallel execution of provisioning tasks across cloud services and cloud service providers. These provisioning adapters are separate 'classes/libraries' that implement specific provisioning APIs at the level of each operation mapped to the provider API. The adapter classes are implemented using the Interface design pattern. In this respect, the fulfillment and management bus 410 supports multiple adapter invocation approaches including standard web service protocols and REST API protocols, as well as custom approaches depending on the service provider capabilities.

The auto provisioning adapters 414 and the manual workflow scripts 416 each provide respective functionality for fulfilling (e.g., provisioning) supported cloud service orders (e.g., services of cloud service providers offering their services directly through a CSB platform configured in accordance with an embodiment of the present invention). The auto provisioning adapters 414 facilitate provisioning and other related fulfillment activities (e.g., pertinent notifications) of such supported services in an automated fashion (i.e., without human intervention). For example, the auto provisioning adapters 414 can each cause actions to be performed for provisioning one or more supported services by invoking actions based on information defined by and associated with such one or more supported services. The manual workflow scripts 416 enable provisioning and other related fulfillment activities (e.g., pertinent notifications) of one or more supported services that cannot be otherwise fulfilled in an automated manner (e.g., via the auto provisioning adapters 414). For example, the manual workflow scripts 416 use information defined by and associated with such one or more supported services to issue workflow tasks required for facilitating provisioning, thereby allowing such provisioning to be manually carried out.

The external fulfillment adapters work in conjunction with cloud service fulfillment agents to facilitate provisioning and other related fulfillment activities (e.g., pertinent notifications) of externally supported services in an automated fashion (i.e., without human intervention). Advantageously, implementation of external fulfillment adapters and cloud service fulfillment agents provide a layer of abstraction between cloud service providers and a cross-provider cloud service offering system (e.g., a cloud service brokerage platform). In this respect, the externalized service fulfillment adapters 418 and associated fulfillment agents are beneficial because they allow service providers and integration specialist to build fulfillment agents and adapters that are customized to their solution. This provides support for building an infrastructure of additional services and service integration specialists.

The external fulfillment adapters 418 are under control of the system from which fulfillment is requested such as, for example, a CSB platform. The fulfillment agents ("agents") are external to the system from which fulfillment is requested and are coupled to or configured to access the service provider system through which cloud services are instantiated or provisioned and/or otherwise caused to be instantiated or provisioned. The fulfillment agents enable standardized operations (e.g., provisioning and/or instantiation operations) as well as agent specific operations. Examples of such standardized operations include, but are not limited to, Create, Destroy, Log, and Status. Agent-specific operations can be any fully or partially automated operation that the agent wants to enable for end-users. Examples of agent-specific operations include, but are not limited to, 'edit/modify', 'increment', 'decrement', 'suspend', 'resume' etc. These operations can be added to the standardized operations as well. Agents can describe themselves programmatically to the fulfillment bridge through a REST interface and notify the fulfillment bridge as to which operations are supported, and what inputs and outputs does the agent support. An administrator can then use this information to map the order attributes and other information to these inputs and outputs. Upon being invoked by a respective adapter to fulfill a service, the fulfillment agent can provide status and log information back to the bridge for ongoing diagnostics, monitoring, as well as ongoing status updates to the end-user to know the percentage completion of the order, and the status of the fulfillment.

Figure 7:
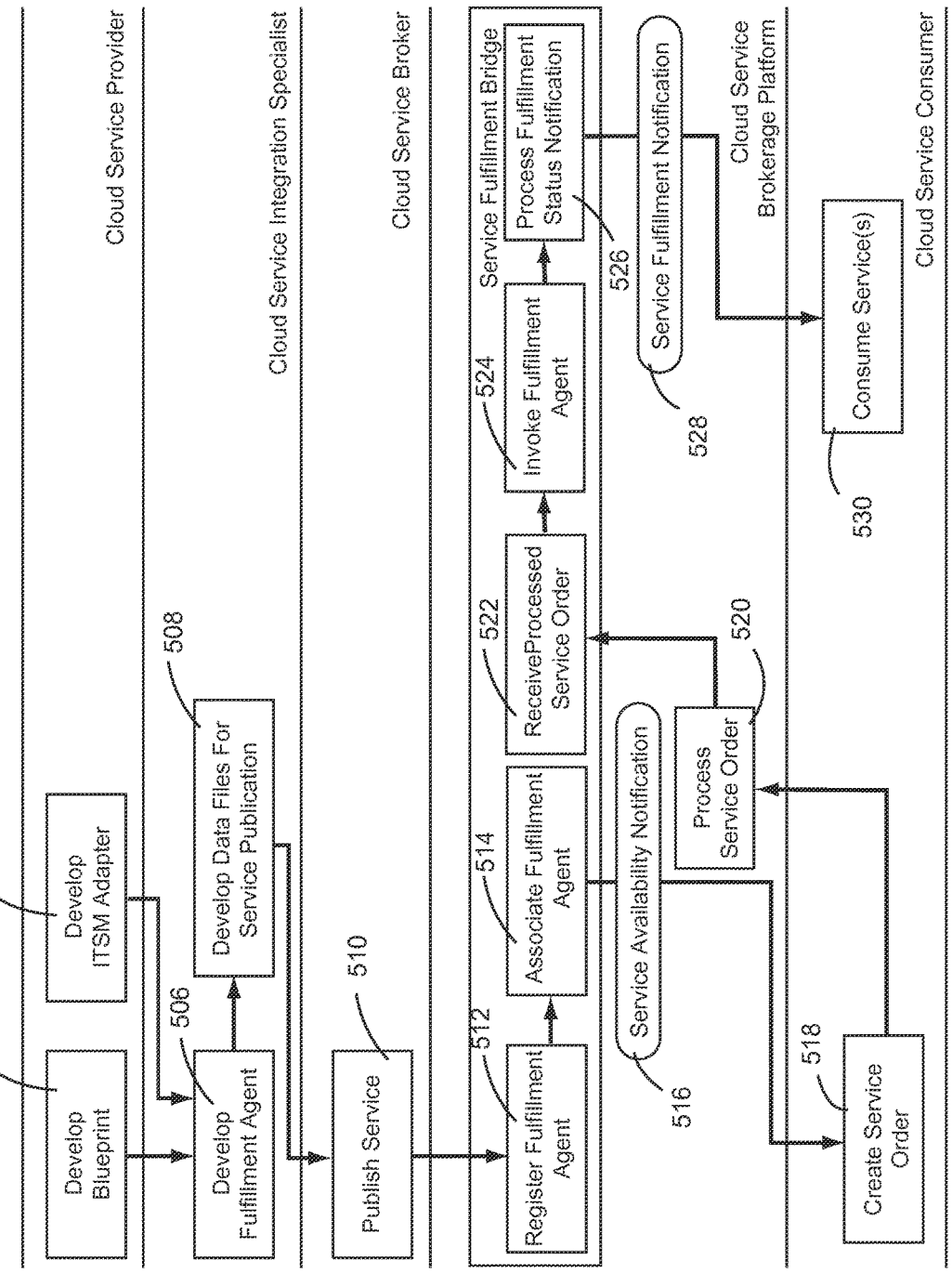
FIG. 7 is a flow diagram showing a service fulfillment operational flow configured in accordance with an embodiment of the present invention.

The Referring now to FIG. 7, a service fulfillment operational flow 500 configured in accordance with an embodiment of the present invention is shown. The service fulfillment operational flow 500 provides for fulfillment of cloud services through the use of fulfillment agents. In preferred embodiments, functionality of the service fulfillment operational flow 500 is provided by one or more integrated functional modules of a within a cloud service brokerage platform such as, for example, the integrated functional modules of the CSB platform 202 discussed above in reference to FIG. 3A.

The service fulfillment operational flow 500 begins with an entity such as, for example, one or more cloud service providers developing a cloud service blueprint (block 502) and/or develops an information technology service management (ITSM) adapter (block 504). Cloud service blueprints and ITSM adapters are examples of cloud service instantiation structures based upon which cloud services can be planned, ordered, and fulfilled. For each cloud service blueprint and ITSM adapters, a fulfillment agent is developed (block 506) is developed by an entity such as, for example, a cloud service integration specialist and information (e.g., data files) for publication of the cloud service corresponding to the fulfillment agent is developed (block 508) by an entity such as, for example, a cloud service integration specialist. An entity such as a cloud service broker, for example, publishes the cloud service corresponding to the fulfillment agent (block 510) to an infrastructure such as, for example, a cloud service store or other type of infrastructure through which cloud service orders can be generated. Such publishing can include adding the cloud service to an electronic cloud service catalog of a CSB platform.

Fire and forget fulfillment agents and status poll fulfillment agents are two examples of different types of fulfillment agents. Fire and forget fulfillment agents do not implement STATUS or LOG actions. In one type of fire and forget fulfillment agent, the service fulfillment bridge assumes that the task or item is complete after immediately invoking the fire and forget agent Thus, once an order action is invoked with this type of fulfillment agent, the fulfillment bridge considers the action as complete, which is useful if email notification or service ticket creation is the goal of the fulfillment. Thus, an 'out-of-the-box' Email agent is an example of a fire and forget fulfillment agent, in which the email agent just sends an email out with the details of the order. In another type of fire and forget fulfillment agent, the service fulfillment bridge assumes that the task or item is considered still in progress. The idea is that in the second case, it is up to the external system to perform a callback or use the CSB platform API to indicate that the task is complete. This avoids the status poll fulfillment agent option, which has to check frequently to see if it is complete.

Status poll fulfillment agents implement a 'STATUS' action that is useful where the fulfillment is asynchronously performed to the action being triggered, or if the provisioning takes a period of time more than a few seconds. When implementing fulfillment with a status poll fulfillment agent, the fulfillment bridge maintains the status as provisioning-in-progress once the action is invoked on the fulfillment agent and then polls the fulfillment agent for the status of the request to establish percentage completion, errors, failures, messages and/or successful completion. An example of a status poll fulfillment agent is a blueprint provisioning agent, which takes about 15-20 minutes to provision an entire set of services in a cloud service blueprint. Such a cloud service blueprint can include, for example, configuring virtual machines, deploying middleware and monitoring agents, configuring network and middleware, and the like. Another example of a status poll fulfillment agent is a 'ServiceNow' agent, which creates a service ticket in a corresponding system (e.g., a ServiceNow system) and responds back to the fulfillment bridge with a status message (e.g., fulfillment success or fulfillment failed) synchronously on the request.

The fulfillment agent is registered (block 512) with a fulfillment initiating entity such as, for example, a CSB platform (e.g., a service fulfillment bridge thereof). After the fulfillment agent is registered, it is associated with one or more services (block 514) by the fulfillment initiating entity (e.g., a service fulfillment bridge thereof), thereby preferably creating a service availability notification (block 516) for notifying cloud service consumers of the new cloud service (i.e., a cloud service).

Preferably, the fulfillment agent implements a self-registration interface that is used by implementing entity (e.g., the CSB platform) to understand the capabilities of the fulfillment agent. Examples of such capabilities include, but are not limited to, supported actions and input/output parameters. In preferred embodiments, fulfillment agents can support standard published actions of the CSB platform as well as its own proprietary actions that are made available to the end-user to invoke whereby the fulfillment bridge acts as a pass-through for the actions to be invoked. Examples of these standard published actions are create, destroy, status, log, etc.

Through separate instances of the actions of blocks 502-514, there is a plurality of cloud services that have been registered and associated with a respective cloud service. Thus, a cloud service consuming entity (e.g., a cloud service consumer) can create a cloud service order (block 518) including one or more of the cloud services, the order is processed (block 520) by the fulfillment initiating entity such as, for example, a CSB platform (e.g., a service fulfillment bridge thereof).

A cloud service order may be for a new resource(s) to be provisioned (e.g., a CREATE action), for terminating what has been provisioned (e.g., a DESTROY action), or for changes to existing provisioned resources (e.g., a CHANGE action or an EDIT action). Examples of other actions include a STATUS action that is used by the fulfillment bridge to check with the fulfillment agent on the status of an order request, a LOG action that is used by the fulfillment bridge to retrieve the message/information log from the fulfillment agent that can be displayed back to fulfillment agent administrators for diagnostic and troubleshooting purposes, and other actions such as SUSPEND, RESUME, RESTART, as may be appropriate based on service type. These actions are referred to hereon as service fulfillment actions.

The cloud service order is processed (block 520) by the fulfillment initiating entity (e.g., the CSB platform) and the processed service order is then received (block 522) by the fulfillment initiating entity (e.g., the service fulfillment bridge thereof) and the fulfillment initiating entity (e.g., the service fulfillment bridge thereof) determines and invokes the fulfillment agent corresponding to each cloud service in the cloud service order. The fulfillment initiating entity (e.g., the service fulfillment bridge thereof) then processed a fulfillment status notification (block 526) and issues a service fulfillment notification (block 528). Thereafter, the cloud service consuming entity can begin consuming all or a portion of the cloud services that were in the cloud service order.

Figure 8:
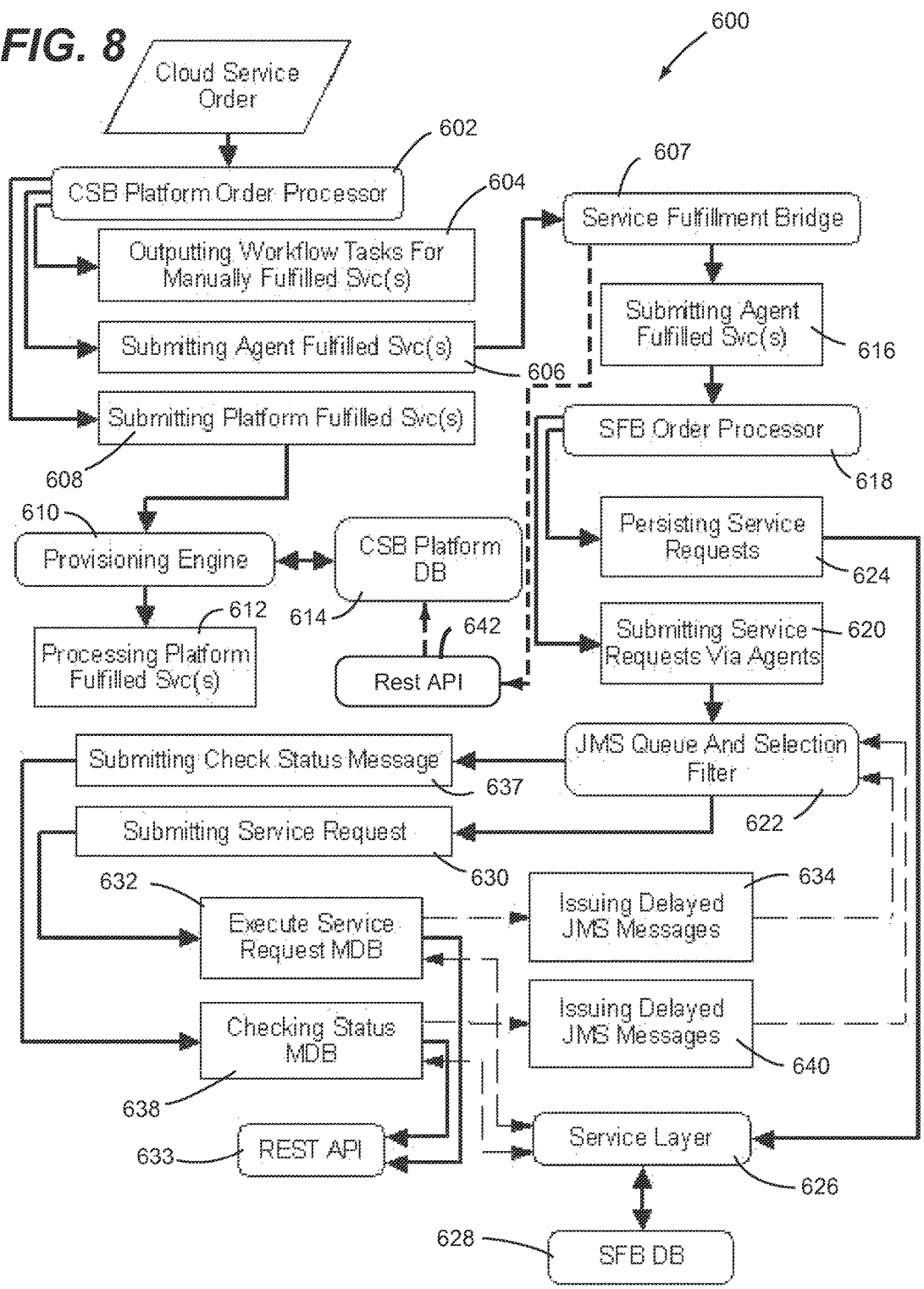
FIG. 8 is a flow diagram showing a service fulfillment bridge technical architecture configured in accordance with an embodiment of the present invention.

FIG. 8 shows a service fulfillment bridge technical architecture 600 configured in accordance with an embodiment of the present invention. The service fulfillment bridge technical architecture 600 provides for fulfillment of cloud services. In preferred embodiments, functionality of the service fulfillment bridge technical architecture 600 is provided by one or more integrated functional modules of a cloud service brokerage platform such as, for example, the integrated functional modules of the CSB platform 202 discussed above in reference to FIG. 3A. For example, the functionality of the service fulfillment bridge technical architecture 600 can be provided by the service fulfillment bridge 248 in FIG. 3A. Dotted lines in FIG. 8 represent feedback messaging.

A CSB platform order processor 602 receives a cloud service order from a cloud service consumer (i.e., a user). The cloud service order can include a mix of cloud services each requiring one of manual fulfillment, agent fulfillment, and CSB platform auto provisioning. After the CSB platform order processor 602 determines the cloud services in the cloud service order, the CSB platform order processor 602 outputs workflow tasks (block 604) for any manually fulfilled service(s) of the service order, submits (block 604) any agent fulfilled service(s) of the service order to a service fulfillment bridge 607, and submits (block 608) any platform fulfilled service(s) of the service order to a CSB platform provisioning engine 610. For the platform fulfilled service(s) of the service order submitted to the CSB platform provisioning engine 610, CSB platform provisioning engine 610 provisions (block 612) such platform fulfilled service(s)

using provisioning information accessed from within a CSB platform database 614. Preferably, the agent fulfilled service(s) of the service order submitted to the service fulfillment bridge 607 are assembled in a JSON (Java Script Object Notion) payload whereby the service fulfillment bridge 607 invokes this JSON payload.

The service fulfillment bridge 607 submits (block 616) the agent fulfilled service(s) of the service order (e.g., in the form of JSON payload) to a service fulfillment bridge order processor 618 of the service fulfillment bridge 607. For each one of the cloud services received, the service fulfillment bridge order processor 618 submits (block 620) a service request to a to a JMS (Java Message Service) queue/selection filter 622 of the service fulfillment bridge 607 and persists (block 624) the service request to a service layer 626 of the service fulfillment bridge 607 for storage in a database 628 of the service fulfillment bridge 607. The JMS queue/selection filter 622 is a messaging queue enabling distribution of service fulfillment requests to enable parallel processing by message driven beans (MDB). The service layer 626 persists the fulfillment request(s) to enable subsequent processing of the service request(s) to be tracked.

The JMS queue/selection filter 622 submits (block 630) each service request to an execute service request MDB (message driven bean) 632, which in turn executes each service request by invoking a respective fulfillment agent with information (e.g., JSON payload) of the respective service request such as, for example, via one or more REST (representational state transfer) interfaces 633. For example, JSON payload of a service request can include details of the cloud service being provisioned. A MDB is a thread from a pool of threads available for processing requests in a JMS queue. If the fulfillment request is of a 'Fire and Forget' type, appropriate logic is applied based on a success or failure response from the fulfillment agent. Alternatively, if the fulfillment request is of a Status Poll type, a delayed JMS message (i.e., a Check Status message) is issued (block 634) to the JMS queue/selection filter 622. A delivery time for this delayed message is dependent on the status check interval configured when the associated cloud service was associated with the fulfillment agent.

For each service request, the JMS queue/selection filter 622 submits (block 636) a check status message to a check status MDB 638. The check status MDB 638 is responsible for processing the check status messages submitted to the check status MDB 638 from the JMS queue/selection filter 622. More specifically, to retrieve the fulfillment status of a particular fulfillment request, the check status MDB 638 invokes the fulfillment agent with the information in the service request (e.g., the JSON payload associated with the particular cloud service). If the fulfillment agent indicates in the response that a cloud service is still in the process of being fulfilled, appropriate logic is applied via invocation of the one or more REST interfaces 642 to communicate the fulfillment status to end user and/or cloud service broker. Furthermore, the check status MDB 638 can issue (block 640) a delayed JMS message (i.e., a Check Status message) to the JMS queue/selection filter 622 for a subsequent check based on a configured time interval such as to allow a cloud service broker to enable cloud service broker to monitor/troubleshoot fulfillment agents via, for example, fulfillment console of the service fulfillment bridge 607. This process is repeated until the fulfillment agent responds with a success or failure on the fulfillment of the cloud service specified in the associated service request. If the fulfillment agent indicates in the response that the cloud service was successfully fulfilled or failed to fulfill, appropriate logic is applied via invocation of the one or more REST interfaces 642 to communicate the fulfillment status to end user and cloud service broker.

A cloud service blueprint is a type of cloud service that itself comprises a plurality of cloud services. With respect to fulfillment agents, a cloud service blueprint is fulfilled through use of a blueprint fulfillment agent (i.e., a specific instantiation of a fulfillment agent) and a blueprint automation script. The blueprint automation script is a type of fulfillment automation script that implements one or more actions requested from the blueprint fulfillment agent. These actions of the fulfillment agent including, but are not limited to, CREATE, DESTROY, STATUS, LOG, and the like. The actual functionality and how it is implemented within a blueprint automation script is up to a particular blueprint developer thereof. If a blueprint automation script is registered in the CSB platform for a service of a cloud service blueprint (i.e., blueprint-based service), this information is passed to the blueprint fulfillment agent through the service fulfillment bridge, thereby enabling a system integrator to implement a single fulfillment agent that can handle multiple blueprints. For example, in an external blueprint repository such as IBM BlueMix, AWS cloudformation templates, and the like, there may be one fulfillment agent for provisioning any IBM BlueMix based blueprints. As part of a service order request to the blueprint fulfillment agent, the specific blueprint script name or script will be passed as an input to that blueprint fulfillment agent.

Implementing fulfillment in accordance with embodiments of the present invention provide for a number of benefits. Asynchronous and distributed fulfillment job execution is beneficial because external adapters/agents can be long running jobs and be implemented independently of CSB brokerage functionality without requiring knowledge of CSB brokerage platform internals. Cloud service store (e.g., orders generated via selection of cloud service offerings from published cloud service offerings) or VDC order fulfillment processing is beneficial because a customer can place either cloud service store orders or VDC orders from a single pane of glass (SPoG) interface. These cloud service orders can have multiple cloud service requests in them, which are then processed by the fulfillment bridge to execute provisioning of the cloud service orders in parallel across multiple cloud service services. End-to-end tracking of service fulfillment with detail log view and error handling support is beneficial because it allows customers to see various tasks and status of each of the tasks at any point in time and resolve errors on their own without requiring intervention by any broker operator personnel or brokerage personnel.

Data Processing System

Figure 9:
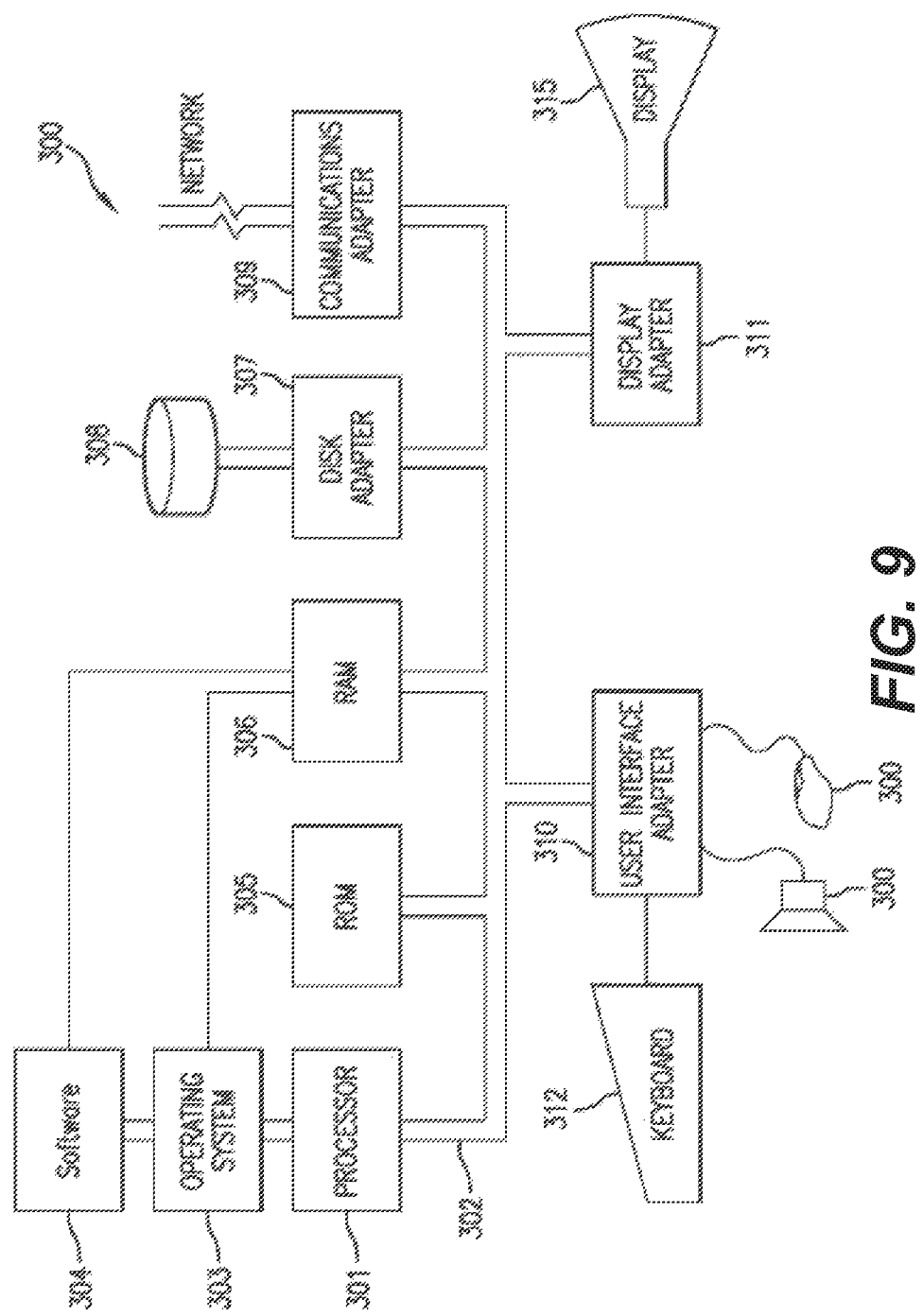
FIG. 9 is a block diagram view showing a data processing system representative of a hardware environment compris-

FIG. 9 shows a data processing system 300 representative of a hardware environment comprising a CSB platform configured in accordance with an embodiment of the present invention (e.g., the CSB platform 202). A server is one example of the data processing system 300. The data processing system 300 a processor 301 coupled to various other components by system bus 302. An operating system 303 runs on processor 301 and provides control and coordinates the functions of the various components of the data processing system 300. 2. Software 304 in accordance with the principles of the present invention runs in conjunction with operating system 303 and provides calls to operating system 303 where the calls implement the various functions or services to be performed by software 304 and, optionally, other applications. Software 304 includes a set of instructions (i.e., a program) for providing cloud service brokerage functionality configured in accordance with an embodiment of the present invention (e.g., as disclosed above in FIGS. 2-5).

Read-only memory ("ROM") 305 is coupled to system bus 302 and includes a basic input/output system ("BIOS") that controls certain basic functions of capacity planning system 104. Random access memory ("RAM") 306 and disk adapter 307 are also coupled to system bus 302. It should be noted that software components including operating system 303 and software 304 can be loaded into RAM 306, which may be the main memory of execution for the CSB platform 202. Disk adapter 307 may be an integrated drive electronics ("IDE") adapter that communicates with a disk unit 308, e.g., disk drive.

The data processing system 300 may further include a communications adapter 309 coupled to bus 302. Communications adapter 309 interconnects bus 302 with an outside network (e.g., outside network 243 shown in FIG. 4) enabling the CSB platform 202 to communicate with other devices.

I/O devices may also be connected to the CSB platform 202 via a user interface adapter 310 and a display adapter 311. Keyboard 312, mouse 313 and speaker 314 may all be interconnected to bus 302 through user interface adapter 310. Data may be inputted to the CSB platform 202 through any of these devices. A display monitor 315 may be connected to system bus 302 by display adapter 311. In this manner, a user is capable of inputting to the CSB platform 202 through keyboard 312 or mouse 313 and receiving output from the CSB platform 202 via display 315 or speaker 314.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. In preferred embodiments, the computer readable program code is implemented via a non-transitory computer-readable storage medium having tangibly embodied thereon and accessible therefrom instructions interpretable by at least one data processing device.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device).

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are/can be described herein with reference to textual descriptions, flowchart illustrations and/or block diagrams of methods, apparatus (systems) and computer program products according to embodiments of the present invention. It will be understood that portions of the textual descriptions, flowchart illustrations and/or block diagrams, and combinations thereof can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the textual descriptions, flowchart illustrations and/or block diagrams, and combinations thereof. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the textual descriptions, flowchart illustrations and/or block diagrams, and combinations thereof. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/ acts specified in the textual descriptions, flowchart illustrations and/or block diagrams, and combinations thereof.

Although the invention has been described with reference to several exemplary embodiments, it is understood that the words that have been used are words of description and illustration, rather than words of limitation. Changes may be made within the purview of claims supported by the disclosures made herein, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the claims supported by the disclosures made herein.

What is claimed is:

1. A system for fulfilling cloud service orders of cloud service consumers, said system comprising:
    a cloud service provider system including a cloud service blueprint repository, at least one data processing device and a non-transitory computer-readable storage medium, wherein the non-transitory computer-readable storage medium of the cloud service provider system has tangibly embodied thereon and accessible therefrom instructions interpretable by the at least one data processing device of the cloud service provider system and wherein the instructions accessible from the non-transitory computer-readable storage medium of the cloud service provider system are configured for causing the at least one data processing device of the cloud service provider system to perform a method comprising:
        receiving a plurality of cloud service blueprints each comprising a plurality of cloud services;
        storing the cloud service blueprints in the cloud service blueprint repository;
        receiving blueprint fulfillment information defining provisioning actions required for fulfilling each cloud service of each one of the cloud service blueprints thereby allowing the blueprint fulfillment information to be used for implementing provisioning of the cloud services of each of the cloud service blueprints;
        receiving a blueprint automation script associated with each one of the cloud service blueprints, wherein each blueprint automation script defines the provisioning actions required for fulfilling the cloud services of a respective one of the cloud service blueprints; and
        issuing information used for enabling registration of each one of the blueprint automation script by a system through which the cloud service blueprints and cloud services thereof are procured; and
    a cloud services brokerage platform coupled to the cloud service provider system through a fulfillment information application programming interface (API) for enabling communication of information therebetween, wherein the cloud services brokerage platform includes a cloud service bus through which the fulfillment information API is instantiated to provide an interface through which information is communicated between the cloud services brokerage platform and the cloud service provider system using a message-based architecture that allows asynchronous and parallel execution of provisioning tasks across cloud services and cloud service providers, wherein the cloud service bus comprises an inbuilt data driven engine that supports multiple workflow definitions and process definitions for at least one of cloud services, cloud service providers and cloud service types, wherein the cloud services brokerage platform comprises
    at least one data processing device and a non-transitory computer-readable storage medium, wherein the non-transitory computer-readable storage medium of the cloud services brokerage platform has tangibly embodied thereon and accessible therefrom instructions interpretable by the at least one data processing device of the cloud services brokerage platform, wherein the instructions accessible from the non-transitory computer-readable storage medium of the cloud services brokerage platform are configured to perform a method comprising:
        registering the blueprint automation script associated with each one of the cloud service blueprints in response to receiving the information used for enabling said registration thereof, wherein said registering enables procurement of the cloud service blueprint associated with a respective one of the blueprint automation scripts;
        receiving, from a cloud service consumer, a cloud service order including a designated one of the cloud service blueprints for which the blueprint automation script has been registered; and
        implementing fulfillment of the cloud services of the designated one of the cloud service blueprints, wherein said implementing includes transmitting, for reception by the cloud service provider system in response to receiving the cloud service order, a service order request including information defining the blueprint automation script associated with designated one of the cloud service blueprints and includes performing end-to-end tracking of said fulfillment of the cloud services, wherein said end-to-end tracking includes providing a log view and error handling for enabling tasks and status of each of provisioning actions undertaken during such fulfillment to be accessed by the cloud service consumer and for enabling errors associated with such provisioning actions to be resolved by the cloud service consumer without requiring intervention by any cloud services brokerage platform personnel.

2. The system of claim 1 wherein
the fulfillment information provides an abstraction layer that correlates an information structure of cloud service defining information of the cloud services for which the fulfillment information is configured to implement fulfillment thereof with provisioning actions required for implementing fulfillment of the cloud service blueprints each respective ones of the cloud services.

3. The system of claim 1 wherein
registering each blueprint automation script includes at least one of associating a name of a respective one of the blueprint automation scripts with a corresponding one of the cloud service blueprints and associating provisioning actions defined by a respective one of the blueprint automation scripts with a corresponding one of the cloud service blueprints.

4. A method for fulfilling cloud service orders of cloud service consumers, said method comprising:
    providing a cloud service provider system including a cloud service blueprint repository, at least one data processing device and a non-transitory computer-readable storage medium, wherein the non-transitory computer-readable storage medium of the cloud service provider system has tangibly embodied thereon and accessible therefrom instructions interpretable by the at least one data processing device of the cloud service provider system and wherein the instructions accessible from the non-transitory computer-readable storage medium of the cloud service provider system are configured for causing the at least one data processing device of the cloud service provider system to perform a method comprising:

receiving a plurality of cloud service blueprints each comprising a plurality of cloud services;

storing the cloud service blueprints in the cloud service blueprint repository;

receiving blueprint fulfillment information defining provisioning actions required for fulfilling each cloud service of each one of the cloud service blueprints thereby allowing the blueprint fulfillment information to be used for implementing provisioning of the cloud services of each of the cloud service blueprints;

receiving a blueprint automation script associated with each one of the cloud service blueprints, wherein each blueprint automation script defines the provisioning actions required for fulfilling the cloud services of a respective one of the cloud service blueprints; and issuing information used for enabling registration of each one of the blueprint automation script by a system through which the cloud service blueprints and cloud services thereof are procured; and providing a cloud services brokerage platform coupled to the cloud service provider system through a fulfillment information application programming interface (API) for enabling communication of information therebetween, wherein the cloud services brokerage platform includes a cloud service bus through which the fulfillment information API is instantiated to provide an interface through which information is communicated between the cloud services brokerage platform and the cloud service provider system using a message-based architecture that allows asynchronous and parallel execution of provisioning tasks across cloud services and cloud service providers, wherein the cloud service bus comprises an inbuilt data driven engine that supports multiple workflow definitions and process definitions for at least one of cloud services, cloud service providers and cloud service types, wherein the cloud services brokerage platform comprises at least one data processing device and a non-transitory computer-readable storage medium, wherein the non-transitory computer-readable storage medium of the cloud services brokerage platform has tangibly embodied thereon and accessible therefrom instructions interpretable by the at least one data processing device of the cloud services brokerage platform, wherein the instructions accessible from the non-transitory computer-readable storage medium of the cloud services brokerage platform are configured to perform a method comprising:

registering the blueprint automation script associated with each one of the cloud service blueprints in response to receiving the information used for enabling said registration thereof, wherein said registering enables procurement of the cloud service blueprint associated with a respective one of the blueprint automation scripts;

receiving, from a cloud service consumer, a cloud service order including a designated one of the cloud service blueprints for which the blueprint automation script has been registered; and implementing fulfillment of the cloud services of the designated one of the cloud service blueprints, wherein said implementing includes transmitting, for reception by the cloud service provider system in response to receiving the cloud service order, a service order request including information defining the blueprint automation script associated with designated one of the cloud service blueprints and includes performing end-to-end tracking of said fulfillment of the cloud services, wherein said end-to-end tracking includes providing a log view and error handling for enabling tasks and status of each of provisioning actions undertaken during such fulfillment to be accessed by the cloud service consumer and for enabling errors associated with such provisioning actions to be resolved by the cloud service consumer without requiring intervention by any cloud services brokerage platform personnel.

5. The method of claim 4 wherein the fulfillment information provides an abstraction layer that correlates an information structure of cloud service defining information of the cloud services for which the fulfillment information is configured to implement fulfillment thereof with provisioning actions required for implementing fulfillment of the cloud service blueprints each respective ones of the cloud services.

6. The method of claim 4 wherein registering each blueprint automation script includes at least one of associating a name of a respective one of the blueprint automation scripts with a corresponding one of the cloud service blueprints and associating provisioning actions defined by a respective one of the blueprint automation scripts with a corresponding one of the cloud service blueprints.

7. A non-transitory computer-readable storage medium of an apparatus comprising a cloud service provider system and a cloud services brokerage platform, the cloud services brokerage platform coupled to the cloud service provider system through a fulfillment information application programming interface (API) for enabling communication of information therebetween, the cloud services brokerage platform includes a cloud service bus through which the fulfillment information API is instantiated to provide an interface through which information is communicated between the cloud services brokerage platform and the cloud service provider system using a message-based architecture that allows asynchronous and parallel execution of provisioning tasks across cloud services and cloud service providers, the cloud service bus comprises an inbuilt data driven engine that supports multiple workflow definitions and process definitions for at least one of cloud services, cloud service providers and cloud service types, the apparatus comprises at least one data processing device and a non-transitory computer-readable storage medium, the non-transitory computer-readable storage medium has tangibly embodied thereon and accessible therefrom instructions interpretable by the at least one data processing device of the cloud services brokerage platform, the instructions accessible from the non-transitory computer-readable storage medium and configured for causing the at least one data processing device to perform a method comprising:

receiving a plurality of cloud service blueprints each comprising a plurality of cloud services;

storing the cloud service blueprints in the cloud service blueprint repository;

receiving blueprint fulfillment information defining provisioning actions required for fulfilling each cloud service of each one of the cloud service blueprints thereby allowing the blueprint fulfillment information to be used for implementing provisioning of the cloud services of each of the cloud service blueprints;

receiving a blueprint automation script associated with each one of the cloud service blueprints, wherein each blueprint automation script defines the provisioning actions required for fulfilling the cloud services of a respective one of the cloud service blueprints;

issuing information used for enabling registration of each one of the blueprint automation script by a system through which the cloud service blueprints and cloud services thereof are procured;

registering the blueprint automation script associated with each one of the cloud service blueprints in response to receiving the information used for enabling said registration thereof, wherein said registering enables procurement of the cloud service blueprint associated with a respective one of the blueprint automation scripts;

receiving, from a cloud service consumer, a cloud service order including a designated one of the cloud service blueprints for which the blueprint automation script has been registered; and implementing fulfillment of the cloud services of the designated one of the cloud service blueprints, wherein said implementing includes transmitting, for reception by the cloud service provider system in response to receiving the cloud service order, a service order request including information defining the blueprint automation script associated with designated one of the cloud service blueprints and includes performing end-to-end tracking of said fulfillment of the cloud services, wherein said end-to-end tracking includes providing a log view and error handling for enabling tasks and status of each of provisioning actions undertaken during such fulfillment to be accessed by the cloud service consumer and for enabling errors associated with such provisioning actions to be resolved by the cloud service consumer without requiring intervention by any cloud services brokerage platform personnel.

8. The non-transitory computer-readable storage medium of claim 7 wherein the fulfillment information provides an abstraction layer that correlates an information structure of cloud service defining information of the cloud services for which the fulfillment information is configured to implement fulfillment thereof with provisioning actions required for implementing fulfillment of the cloud service blueprints each respective ones of the cloud services.

9. The non-transitory computer-readable storage medium of claim 7 wherein registering each blueprint automation script includes at least one of associating a name of a respective one of the blueprint automation scripts with a corresponding one of the cloud service blueprints and associating provisioning actions defined by a respective one of the blueprint automation scripts with a corresponding one of the cloud service blueprints.

* * * * *